(12) United States Patent
Abe et al.

(10) Patent No.: US 6,257,591 B1
(45) Date of Patent: Jul. 10, 2001

(54) METAL GASKET AND PROCESS FOR MANUFACTURING THE SAME

(75) Inventors: Yoshitaka Abe; Hironobu Imanaka; Kazuhiko Ikeda; Takashi Suzuki, all of Toyonaka (JP)

(73) Assignee: Kokusan Parts Industry Co., Ltd., Osaka (JP)

( * ) Notice: Subject to any disclaimer, the term of this patent is extended or adjusted under 35 U.S.C. 154(b) by 0 days.

(21) Appl. No.: 08/991,863

(22) Filed: Dec. 16, 1997

(30) Foreign Application Priority Data

Dec. 16, 1996 (JP) .................................................. 8-335646
Mar. 27, 1997 (JP) .................................................. 9-075279

(51) Int. Cl.⁷ ..................................................... F16J 15/08
(52) U.S. Cl. ........................... 277/591; 277/593; 277/598
(58) Field of Search .................................. 277/591, 593, 277/594, 595, 598

(56) References Cited

U.S. PATENT DOCUMENTS

| | | | |
|---|---|---|---|
| 4,196,913 | * | 4/1980 | Oka . |
| 4,202,311 | * | 5/1980 | Moriyoshi . |
| 4,335,890 | * | 6/1982 | Nicholson . |
| 4,861,046 | * | 8/1989 | Udagawa . |
| 5,310,196 | * | 5/1994 | Kawaguchi et al. ................. 277/595 |
| 5,490,681 | * | 2/1996 | Plunkett et al. . |
| 5,584,490 | * | 12/1996 | Inoue et al. . |
| 5,653,451 | * | 8/1997 | Udagawa . |
| 5,906,376 | * | 5/1999 | Udagawa et al. . |

FOREIGN PATENT DOCUMENTS

| | | | |
|---|---|---|---|
| 41 42 600 | * | 7/1993 | (DE) . |
| 5-65959 | | 3/1993 | (JP) . |
| 8-86360 | | 4/1996 | (JP) . |

* cited by examiner

*Primary Examiner*—Anthony Knight
*Assistant Examiner*—John L. Beres
(74) *Attorney, Agent, or Firm*—Armstrong, Westerman, Hattori, McLeland & Naughton

(57) ABSTRACT

A metal gasket comprising a least one gasket sheet, wherein a hardness lowering region having a locally lowered hardness is formed in the gasket sheet in at least either a portion to be set to have a large elongation or a portion to be lowered in a spring constant. Also disclosed is a metal gasket manufacturing process comprising: the step of forming an opening of a desired size in registration with a cylinder bore in an elastic metal sheet as a material for making a gasket sheet composing a metal gasket; the step of annealing a portion, as corresponding to the first hardness lowering region in the gasket sheet, of the elastic metal sheet; and the step of forming a folded portion by folding back the vicinity of the opening.

13 Claims, 21 Drawing Sheets

METAL GASKET AND PROCESS FOR MANUFACTURING THE SAME

BACKGROUND OF THE INVENTION

1. Field of the Invention

The present invention relates to a metal gasket composed of a folded portion and a sealing bead, and a process for manufacturing the metal gasket.

2. Related Art

As a metal gasket to be sandwiched between a cylinder block and a cylinder head of an engine, there have been proposed and practiced a variety of metal gaskets of a single-sheet or plural-sheet construction, which are made to regulate an abnormal deformation in a bead to be arranged at the outer circumference of a folded portion, by forming an opening in registration with a cylinder bore, and by forming the folded portion at the edge of the opening to retain a clearance as thick as the folded portion at the outer circumference of the folded portion.

However, the folded portion is subjected at its edge to a repeated load in the thickness direction (as will be called the "compressing direction") of the metal gasket when the engine is run, because it is sandwiched between the cylinder head and the cylinder block, and is subjected to a repeated load in the facial direction (as will be called the "shearing direction") of the metal gasket due to the temperature change from the difference in the coefficient of thermal expansion between the cylinder head and the cylinder block. As a result, as shown in FIG. 32, there arises a problem that cracks 101 penetrate into a folded edge 100 from the inside to break a folded portion 102.

In the prior art, therefore, the mainstreams of the prior art are given plural-sheet constructions in which the metal gasket is composed of two or more gasket sheets. In one mainstream construction, a folded portion is so formed in the second gasket sheet as to embrace the opening edge of the first gasket sheet thereby to enlarge its radius of curvature so that the cracks at the folded edge are prevented. In another mainstream construction, the cracks at the folded edge are prevented by making the first gasket sheet of a material having a little elongation but a high tensile strength to have excellent spring properties, by making the second gasket sheet of a material having a low tensile strength but a large elongation, by forming a bead in the first gasket sheet to retain a sufficient bead performance and by forming the folded portion in the second gasket sheet.

In Unexamined Published Japanese Patent Application No. 5-65959, moreover, there has also been proposed a metal gasket which is constructed to suppress the cracks in the folded portion by forming an annular groove in a position corresponding to the inner face of a folded edge before the folded portion is formed in an elastic metal sheet for the gasket sheet, to enlarge the radius of curvature of the folded edge.

As the beads in the gasket sheet, on the other hand, there are formed the rounded beads or stepped beads enclosing a combustion chamber, oil holes, bolt holes and outer circumferences. These rounded beads and stepped beads are compressed and deformed between the cylinder block and the cylinder head to establish the desired sealing performance.

Here, the compressively deforming force to act upon the beads is established by a plurality of head fixing bolts to be fastened into the cylinder block. As a result, if the sectional shape and size of the beads are made identical, the bearing stress to act on the beads is made the lower at the more distance from the head fixing bolts by the deflection of the cylinder block or the cylinder head. This raises a problem that the sealing performance drops in that portion. On the other hand, the bearing stress rises in the portions, in which a plurality of beads are arranged close to each other, or in the portions, in which a plurality of beads intersect each other, whereas the bearing stress at the bead portions other than those portions become lower to raise a problem that the sealing performance also drops partially.

In order to solve these problems, it is conceivable to lower or widen the beads at the portions in which the bearing stress rises. However, the method of changing the height of the beads is required to change the height of the bead forming portions in a mold structure for molding the beads. As a result, the mold structure is complicated to raise the cost for producing the mold itself and to make it liable for an offset wear to occur thereby to make the mold maintenance troublesome. It is, therefore, a current practice to adopt a method of adjusting the bearing stress by changing the widths of the beads.

Of the beads for sealing the combustion chamber and the beads for sealing the outer periphery of the metal gasket, on the other hand, the former beads for sealing the combustion gas under a high pressure are more strictly demanded for the sealing performance. It is, therefore, a current practice to employ the rounded beads as the former ones and the stepped beads as the latter ones. As a result, the bearing stress of the beads around the combustion chamber is set to a higher level than that of the beads of the outer periphery thereby to provide a sufficient sealing performance.

Moreover, there has been widely adopted in the prior art a technique for raising the hardness of beads as a whole by subjecting the entire gasket sheet to a heat treatment.

The metal gasket of the prior art is basically constructed to prevent the cracks at the folded edge by adopting the method of enlarging the radius of curvature of the folded edge and the method of employing a material having a large elongation for the gasket sheet to form the folded portion. For the former method, it is difficult to reduce the cracks sufficiently at the folded edge. For the latter method, it is impossible to manufacture a metal gasket having a single-sheet construction, but an expensive material having an excellent elongation has to be used to raise a problem that the production cost is raised.

We have been able to attain the following concept on the mechanism for the cracks to occur at the folded edge. This concept has been attained by noting that the hardness of the vicinity of the folded portion is caused, when the elastic metal sheet is folded, by the hardening action of the folding operation to take a numerical value, as shown in FIG. 33, for SUS430 2B so that the hardness at the folded edge becomes higher than that of the remaining portions to invite the cracks. By this notation, the hardness of only the vicinity of the folded edge is lowered to ensure its sufficient elongation so that the folded edge can be freed from the cracks while retaining sufficient spring characteristics at the remaining portions.

As to the bead portions, on the other hand, it may be impossible from the restrictions on the space to improve the sealing performances by changing the width of the beads, as described above. In the portions in which a plurality of beads are arranged close to each other, more specifically, the beads may be unable, if wide, to be arranged from the restrictions on the space. Moreover, the restrictions on the space become the more severe in accordance with the smaller size of the engine of recent years. The result at the present stage is that the design is compelled to sacrifice the sealing performance to some extent.

We have found out that the bearing stress to act on the beads can be adjusted to a low level by lowering the hardness of the portion, the bearing stress of which is to be lowered, like before to lower the spring constant of the beads without changing the width of the beads.

SUMMARY OF THE INVENTION

An object of the invention is to provide not only a metal gasket, which is equipped with a gasket sheet capable of preventing cracks at a folded edge while sufficiently retaining spring characteristics of portions other than a folded portion, and a process for manufacturing the metal gasket but also a metal gasket, which is compact and excellent in a sealing performance by drastically enlarging the degree of freedom for designing the adjustment of a bearing stress, and a process for manufacturing the metal gasket.

According to a first aspect of the invention, there is provided a metal gasket comprising a least one gasket sheet, wherein a hardness lowering region having a locally lowered hardness is formed in the gasket sheet in at least either a portion to be set to have a large elongation or a portion to be lowered in a spring constant.

By this construction, it is made possible to locally adjust the elongations and spring constants of the necessary portions of the gasket sheet thereby to realize a metal gasket which is excellent in durability and sealing properties. As in a second aspect, more specifically, a first hardness lowering region for increasing the elongation of the folded portion may be formed in the folded portion to prevent the cracks at the folded edge. As in a fourteenth aspect, alternatively, a second hardness lowering region for reducing the spring constant may be formed in a suitable portion of the bead so that the bearing stress to act on the bead can be adjusted to improve the sealing performance.

According to the second aspect, the gasket sheet includes: an opening formed to correspond to a cylinder bore; a folded portion formed along the whole circumference of the edge of the opening; and a first hardness lowering region formed as the hardness lowering region in the whole or partial portion of the folded edge of at least the folded portion for enlarging the elongation.

In this metal gasket, when the folded portion is formed in the gasket sheet, the hardness of the folded edge is raised by the hardening action of the folding operation. Since the first hardness lowering region is formed in the folded portion, however, the hardness of the gasket sheet is locally lowered so that the hardness of the folded edge is substantially suppressed below a low level. In other words, the elongation of the material at the folded edge is sufficiently retained to prevent the cracks at the folded edge. Moreover, only the hardness of the first hardness lowering region is lowered so that the spring characteristics at the remaining portions are not lowered.

According to a third aspect, the hardness of the first hardness lowering region may preferably be made no less than that of the remaining portions. By this setting, the elongation of the folded edge is sufficiently retained to prevent the cracks effectively at the folded edge.

According to a fourth aspect, the gasket sheet may be made of a rolled sheet, and the first hardness lowering region may be formed in a portion within a range of a predetermined angle around the portion, as extended at a right angle with respect to the rolled sheet, of the folded edge. By this construction, the cracks at the folded edge are effectively prevented while minimizing the range for forming the first hardness lowering region. In the rolled sheet, more specifically, the elongation in the rolling direction is smaller than that at a right angle so that the cracks at the folded edge can be prevented while minimizing the range for forming the first hardness lowering region, by lowering the hardness of only the portion, which is to be extended in the rolling direction when the folded portion is to be formed, of the folded edge.

According to a fifth aspect, an annular bead may be formed at the outer circumference of the folded portion, and the first hardness lowering region may be formed in the whole or partial circumference at the inner circumference of the annular bead. By this construction, the cracks at the folded edge are prevented while retaining the spring characteristics of the annular bead sufficiently.

According to a sixth aspect, the gasket sheet forming the folded portion may be made of a ferrite stainless steel sheet, as represented by SUS301-CSP H, SUS304-CSP H or SUS430 conforming to the Japanese Industrial Standards. This construction is preferable for sufficiently retaining the spring characteristics at the portions other than the first hardness lowering region, and for sufficiently retaining the elongation at the first hardness lowering region of the folded edge. As a specific hardness, according to a seventh aspect, the hardness of the first hardness lowering region may preferably be set to a Vickers hardness Hv of 170 to 445. According to an eighth aspect, moreover, the difference between the hardnesses of the first hardness lowering region and the remaining regions is set to a Vickers hardness of 0 to 260, so that the cracks due to an extreme hardness difference can be prevented in advance.

According to a ninth aspect, moreover, at least the whole or partial circumference of the folded edge may be made thinner than the remaining portions. By this construction, the radius of curvature of the folded portion can be set to a large value, and the elongation of the folded edge when the folded portion is to be formed can be reduced to prevent the cracks more effectively at the folded edge.

According to a tenth aspect, there is provided a metal gasket manufacturing process comprising: the step of forming an opening of a desired size in registration with a cylinder bore in an elastic metal sheet as a material for making a gasket sheet composing a metal gasket according to any of the aspects 2 to 9; the step of annealing a portion, as corresponding to the first hardness lowering region in the gasket sheet, of the elastic metal sheet; and the step of forming a folded portion by folding back the vicinity of the opening. According to this manufacture process, the hardness of the folded edge is raised by the hardening action of the folding operation by forming the folded portion in the elastic metal sheet, the hardness of the portion, as corresponding to the folded edge and liable to cause the cracks, that is, the portion corresponding to the first hardness lowering region of the gasket sheet is drastically lowered by the annealing treatment which has been performed before the folding operation, so that the apparent hardness is suppressed below a low value even if the hardness is raised by the folding operation. In short, in the gasket sheet thus prepared, the hardness of the folded edge is suppressed below the low value so that the elongation at the folded edge is sufficiently retained to prevent the cracks.

According to an eleventh aspect, there is provided a metal gasket manufacturing process comprising: the step of forming an opening slightly smaller than a desired size in registration with a cylinder bore in an elastic metal sheet as a material for making a gasket sheet composing a metal gasket according to any of the aspects 2 to 9; the step of annealing a portion, as corresponding to the first hardness lowering region in the gasket sheet, and the inner circumferential portion of the elastic metal sheet; the step of punching the opening to a desired size; and the step of forming a folded portion by folding back the vicinity of the opening of the desired size. According to this manufacture process, in addition to operations like those of the aspect 9, the opening having a slightly smaller diameter than the demanded size is formed in advance and shaped into the demanded size by punching it after the annealing treatment. As a result, even if the size of the opening is varied by the annealing treatment, the portion having the varied size is removed by the punching treatment after the annealing treatment so that the opening to be formed has the proper size.

According to a twelfth aspect, there is provided a metal gasket manufacturing process comprising: the step of forming an opening of a desired size in registration with a cylinder bore in an elastic metal sheet as a material for making a gasket sheet composing a metal gasket according to any of the aspects 2 to 9; the step of forming a raised portion by burling the elastic metal sheet in the vicinity of the opening of the desired size; the step of annealing a portion, as corresponding to the first hardness lowering region in the gasket sheet, of the root of the raised portion; and the step of forming a folded portion by folding back the raised portion. According to this manufacture process, in addition to operations like those of the aspect 9, the portion, as raised by the burling treatment, is annealed so that the root of the raised portion can be efficiently heated for the annealing treatment thereby to minimize the heat transfer to the portions other than the first hardness lowering region.

For the heating at the annealing treatment, any heating means can be adopted if it can heat the elastic metal sheet locally. As in a thirteen aspect, the annealing treatment may preferably be performed by employing induction heating means or laser heating means.

In the metal gasket according to the fourteenth aspect, a sealing bead is formed in the gasket sheet, and the hardness lowering region is a second hardness lowering region formed in at least a longitudinal portion of the bead for reducing a spring constant so as to adjust a bearing stress at the bead.

Even without any change in the width or height of the bead, therefore, a proper bearing stress can be set all over the bead to improve the sealing performance by forming the second hardness lowering region in the portion in which the bearing stress rises. Specifically, the bearing stress is adjusted by changing the hardness of the bead. Thus, it is possible to eliminate the troubles that the mold structure is complicated for a change in the bead height and that the mold structure is difficult to make for a change in the bead width. By combining the construction forming the second hardness lowering region and the construction of changing the height and width of the bead, moreover, the range for adjusting the bearing stress can be further widened. On the other hand, this second hardness lowering region can be easily formed either by annealing such a portion of the elastic metal sheet for the gasket sheet as corresponds to the second hardness lowering region or by hardening the portions of the elastic metal sheet other than the second hardness lowering region.

According to a fifteenth aspect, the hardness of the second hardness lowering region may be adjusted according to the bearing stress demanded for the bead. By this construction, the sealing performance can be improved by adjusting the bearing stress of the bead more finely.

According to a sixteenth aspect, the hardness of the second hardness lowering region may be smoothly changed in the longitudinal direction of the bead. It is then possible to prevent the cracks, as might otherwise be caused by an abrupt hardness change, in advance.

According to a seventeenth aspect, a plurality of beads of difference sealing conditions are formed such that at least one of the beads is formed in its whole length of the second hardness lowering region. It is then to eliminate the complicated design of using the rounded bead and the stepped bead separately according to the sealing conditions. By replacing the stepped bead by the rounded bead having the second hardness lowering region along its whole length, moreover, the gasket sheet can be more small-sized. Specifically, the rounded bead can be branched to seal a plurality of areas, but the stepped bead cannot be branched so that one stepped bead can seal only one area. When the areas of the same number are to be sealed, therefore, the number of stepped beads is larger than that of the rounded beads. For example, the bead width can be made narrower by two merging rounded beads than by two stepped beads brought close to each other. As a result, the rounded beads can be arranged in a smaller space than the stepped beads to make the gasket sheet in a smaller size.

According to an eighteenth aspect, the second hardness lowering region may preferably be formed to equalize the bearing stresses of a series of beads. Even when a plurality of beads are to be formed, their individual sealing conditions are basically set identical along their whole lengths so that the sealing performance can be improved by forming the second hardness lowering region in a manner to equalize the bearing stresses of a series of beads.

According to a nineteenth aspect, the gasket sheet may be made of a rolled sheet, and the second hardness lowering region may be formed in the portion, as extended at a right angle with respect to the rolling direction of the rolled sheet, of the beads. In the gasket sheet made of a rolled sheet, more specifically, there are tendencies that the elongation of the material in the rolling direction is reduced and that the hardness of the bead in the direction perpendicular to the rolling direction is higher than that of the bead in the rolling direction. This makes it possible to adjust the bearing stress by lowering the hardness of the bead which will extend at a right angle with respect to the rolling direction.

According to a twentieth aspect, the gasket sheet having the beads may preferably have a thickness of 0.3 to 0.4 mm. In order to reduce the number of gasket sheets in the metal gasket having the plural-sheet construction, the gasket sheet to be used frequently has a thickness of 0.3 to 0.4 mm, for example. With this thick gasket sheet, the rigidity of the bead is raised, but the durability of the bead portion against the cracks is lowered. By forming the second hardness lowering region for the bead of that thick gasket sheet, therefore, the hardness of the bead can be lowered to prevent the drop in the function of the bead.

According to a twenty first aspect, there is provided a metal gasket manufacturing process according to any of the aspects 14 to 20, wherein an elastic metal sheet for the gasket sheet is annealed at the second hardness lowering region before or after the bead is formed, to make the hardness of the bead in the second hardness lowering region lower than that of the remaining portions.

In this manufacture process, the annealing step of the second hardness lowering region is added to the existing manufacture process so that the metal gasket having the second hardness lowering region can be easily manufactured.

For the heating at the annealing treatment, any heating means can be adopted if it can heat the elastic metal sheet locally. As in a twenty second aspect, for example, the necessary portions can be heated for a short time period to a desired temperature if induction heating means or laser heating means is employed.

According to a twenty third aspect, there is provided a metal gasket manufacturing process according to any of the aspects 14 to 20, wherein an elastic metal sheet for the gasket sheet is hardened at the portions other than the second hardness lowering region before or after the bead is formed, to make the hardness of the bead in the second hardness lowering region lower than that of the remaining portions.

According to this manufacture process, the step of hardening the portions other than the second hardness lowering region is added to the existing manufacture process, so that the metal gasket having the second hardness lowering region can be easily manufactured.

DESCRIPTION OF THE PREFERRED EMBODIMENTS

The invention will be described in connection with its embodiments with reference to the accompanying drawings.

First Embodiment

In this first embodiment, the invention is applied to a metal gasket of a straight four-cylinder engine. This metal gasket 10 of the first embodiment has a first hardness lowering region formed in a folded portion to increase an elongation.

Figure 1:
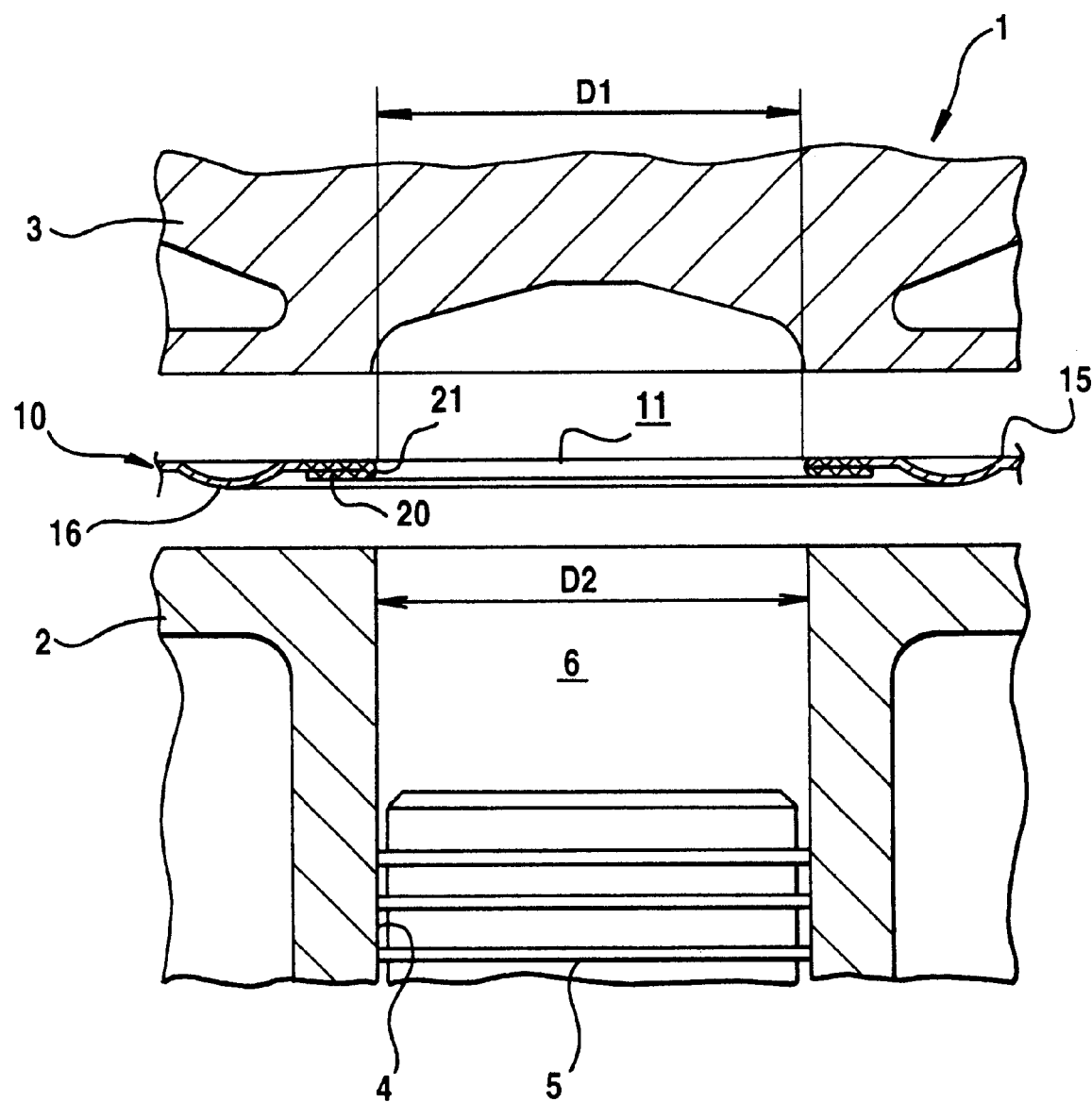
FIG. 1 is a longitudinal section showing an essential portion of an engine which is equipped wit a metal gasket of the invention.

On a cylinder block 2 of an engine 1, as shown in FIG. 1, there is fixed a cylinder head 3 through a plurality of not-shown head fixing bolts. Between the cylinder block 2 and the cylinder head 3, there is sandwiched the metal gasket 10 for sealing their mating faces. The cylinder block 2 is provided with four cylinder bores 4, in each of which a piston 5 is so fitted substantially gas-tight as to move vertically while defining a combustion chamber 6 in the cylinder bore 4 above the piston 5. The cylinder head 3 is provided with not-shown intake ports and exhaust ports to be opened into the combustion chamber 6. These ports are opened/closed at predetermined timings by valve actuating mechanisms which are mounted in the cylinder head 3.

Figure 2:
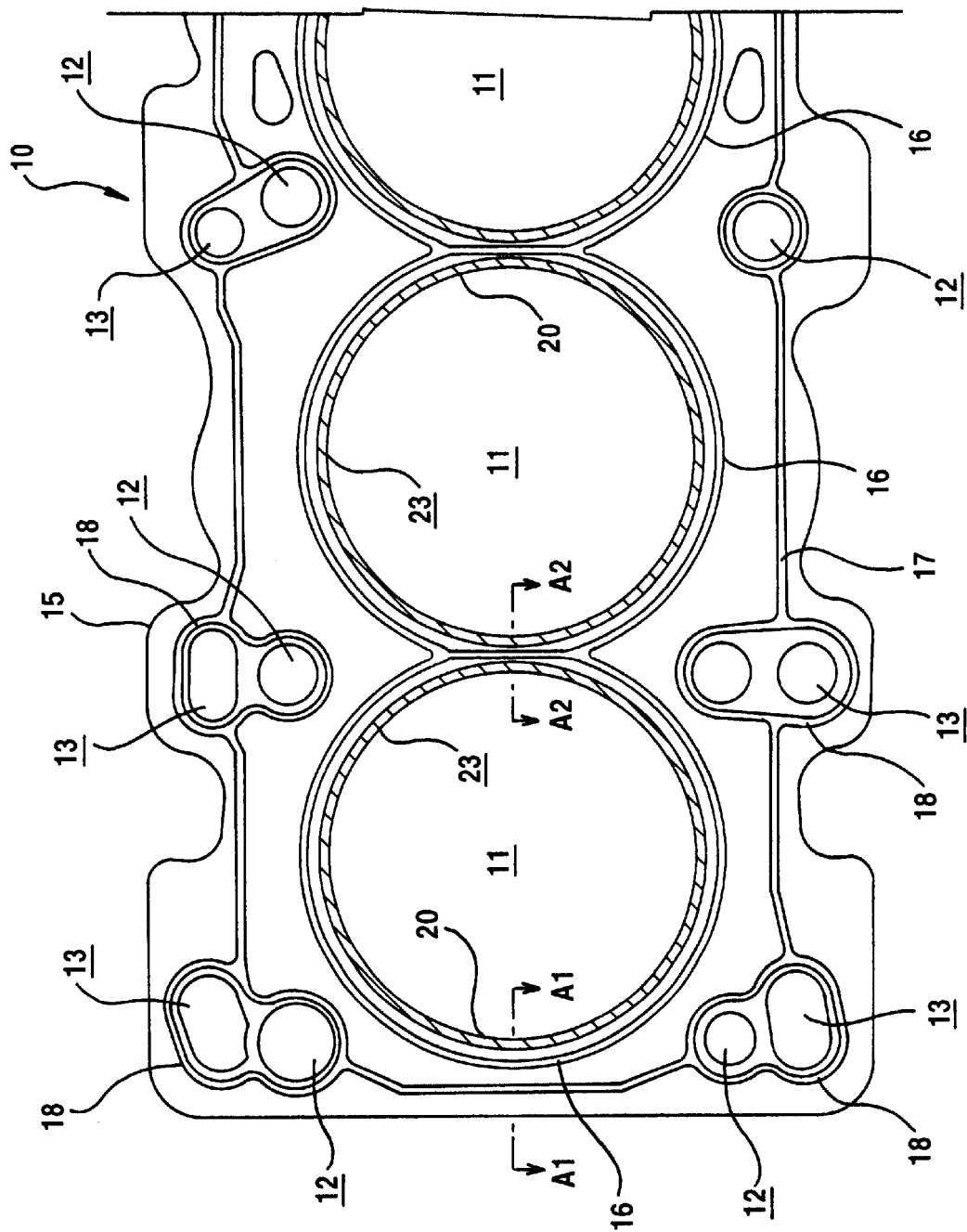
FIG. 2 is a bottom view of the metal gasket.
Figure 3:
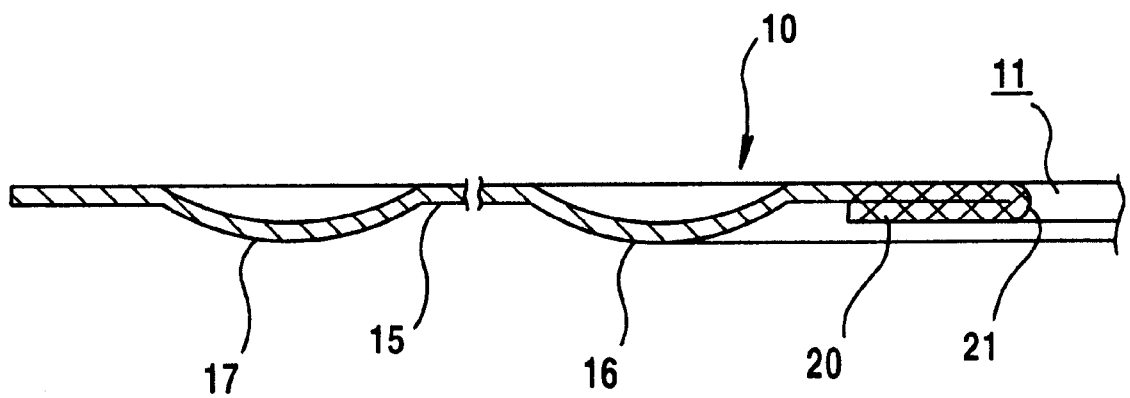
FIG. 3 is a section taken along line A1—A1 of FIG. 2.
Figure 4:
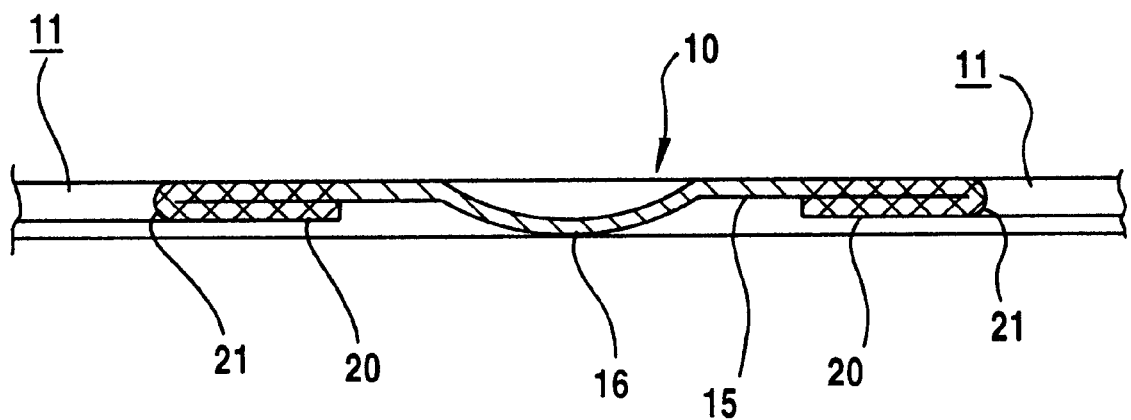
FIG. 4 is a section taken along line A2—A2 of FIG. 2.

In the metal gasket 10, as shown in FIG. 2, there are formed: four openings 11 which are registered with the cylinder bores 4; a plurality of bolt holes 12 into which the head fixing bolts are inserted; and (not-shown) water holes and oil holes 13 for feeding cooling water and lubricating oil between the cylinder block 2 and the cylinder head 3.

As shown in FIGS. 1 to 4, the metal gasket 10 has a single sheet construction which is made of a gasket sheet 15 of an elastic metal sheet and a (not-shown) rubber coating layer of NBR rubber or fluorine containing rubber formed on both the upper and lower faces of the gasket sheet 15. The metal gasket 10 is provided, at the outer circumferential side of the opening 1, with annular beads 16 which are protruded toward the cylinder block 2 and formed to enclose the opening 11 thereby to seal the combustion chamber 6 gas-tight. Moreover, the adjoining annular beads 16 merge into each other in the vicinity of their closest position so that the engine 1 may be small-sized by minimizing the distance between the corresponding cylinder bores 4. At the outer periphery of the gasket sheet 15, there is continuously formed an outer peripheral bead 17 which is protruded toward the cylinder block 2. At the outer peripheries of the bolt holes 12 and the oil holes 13, there are formed hole beads 18 which are annularly branched from portions of the outer peripheral bead 17. Thus, the cooling water and the lubricating oil are sealed by the outer peripheral bead 17 and the hole beads 18.

At the edges of the openings 11 of the gasket sheet 15, there are formed portions 20 which are folded back toward the cylinder block 2 so that clearances as deep as the thickness of the folded portions 20 are left to prevent the beads 16 to 18 from being abnormally deformed when the head fixing bolts are fastened. However, the protruding direction, the sectional shape or the layout of the beads 16 to 18 and the folding direction of the folded portions 20 of the metal gasket 10 are properly set according to the construction or the like of the engine 1. For example, the annular beads 16 may be independent annular beads having no merging portion. The outer peripheral bead 17 and the hole beads 18 may be made independent of each other. The outer peripheral bead 17 may be exemplified by a step bead merely having a step. Basically, the invention can be likewise applied to metal gaskets having constructions other than the shown one, if the metal gaskets have the folded portions 20.

At the inner side of the annular beads 16 of the gasket sheet 15, in the vicinity of at least the folded edges 21 of the annular beads 16, there are formed all over the circumferences first hardness lowering regions 23, as hatched in FIG. 2, which are set to a hardness equal to or less than the remaining portions by annealing them before the folding to lower the hardness, as described hereinafter, to offset such a rise in the hardness as is caused by the hardening action of the folding.

The material for the gasket sheet 15 is preferably exemplified by one having a small elongation and excellent spring characteristics, such as a stainless steel sheet or spring steel sheet having such an elongation as will be drastically raised by the annealing treatment. In other words, the gasket sheet 15 is made of such a material as can establish excellent spring characteristics for enhancing the sealing performance in the beads 16 to 18 and as can enlarge the elongation in the first hardness lowering region 23 to be annealed, to prevent cracks at the folded edges 21.

The hardness of the portions other than the first hardness lowering region 23 is preferably set to a Vickers hardness of 400 to 550 so as to enhance the spring characteristics in the beads 16 to 18. On the other hand, the hardness of the first hardness lowering region 23 is preferably set to a value equal to or lower than that of the remaining portions and to a Vickers hardness of 170 to 445 so as to prevent the cracks in the folded edges 21. Moreover, the difference between the hardnesses of the first hardness lowering region 23 and the remaining regions is preferably set to a Vickers hardness Hv, because the cracks are caused by an abrupt change in the hardness if the difference between the hardnesses of the first hardness lowering region 23 and the remaining regions becomes large.

A preferred specific material may be exemplified by either a ferrite stainless steel sheet, as represented by SUS301-CSP H, SUS304-CSP H or SUS430 2B conforming to the Japanese Industrial Standards and as having the compositions, as tabulated in Table 1, and the mechanical properties, as tabulated in Table 2, or S-4H (made by Nippon Kinzoku Kogyo Kabushiki Gaisha). Materials other than the embodiments could be employed if they satisfy the above-specified properties. In Table 2, there are enumerated the mechanical properties of the solution-treated materials after annealing and the hardened materials before the annealing.

TABLE 1

| Steel Kinds | C | Si | Mn | P | S | Chemical Components (%) Ni | Cr | N |
|---|---|---|---|---|---|---|---|---|
| SUS 301 (-CSP H) | ≤0.15 | ≤1.00 | ≤2.00 | ≤0.045 | ≤0.030 | 6.00 to 8.00 | 16.00 to 18.00 | — |
| SUS 304 (-CSP H) | ≤0.08 | ≤1.00 | ≤2.00 | ≤0.045 | ≤0.030 | 8.00 to 10.50 | 18.00 to 20.00 | — |
| SUS 430 | ≤0.12 | ≤0.75 | ≤1.00 | ≤0.040 | ≤0.030 | — | 16.00 to 18.00 | — |
| S-4 (H) | ≤0.25 | ≤1.00 | 14.00 to 16.00 | ≤0.060 | ≤0.030 | 1.00 to 2.00 | 16.00 to 18.00 | ≤0.50 |

TABLE 2

| | | Tensile Strength N/mm$^2$ | Elongation (%) |
|---|---|---|---|
| SUS 301 (-CSP H) | Before Annealing | 1579 | 7 |
| | After Annealing | 814 | 64 |
| SUS 304 (-CSP H) | Before Annealing | 1351 | 5 |
| | After Annealing | 568 | 55 |

TABLE 2-continued

|  |  | Tensile Strength N/mm² | Elongation (%) |
|---|---|---|---|
| SUS 430 (2B) |  | 476 | 25 |
| S-4 (H) | Before Annealing | 1579 | 6 |
|  | After Annealing | 863 | 51 |

Since the elongation of the folded edge 21 is thus sufficiently retained, the repeated load on the metal gasket 10 in the thickness direction (as will be called the "compressing direction") at the running time of the engine 1, and the repeated load on the metal gasket 10 in the facial direction (as will be called the "shearing direction"), as established due to the difference in the coefficients of thermal expansion between the cylinder block 2 and the cylinder head 3 are effectively absorbed to prevent the cracks in the folded edges 21 in advance. The portions other than the first hardness lowering region 23, that is, the bead portions are not annealed to retain the sufficient spring characteristics so that the combustion chambers 6, the lubricating oil passages and the cooling water passages can be effectively sealed up. In short, the metal gasket 10 is made of the inexpensive material and given the single sheet construction so that it provides the excellent characteristics in which the production cost can be drastically lowered while retaining sufficient sealing performances and preventing the cracks in the folded edges 21. As shown in FIG. 1, the internal diameter D1 of the opening 11 may be modified to be slightly smaller than the internal diameter D2 of the cylinder bore 4 so that so that the folded edge 21 may not be clamped between the cylinder block 2 and the cylinder head 3 thereby to prevent the load in the compressing direction at the running time of the engine 1 from acting directly upon the folded edge 21.

Here will be described a process for manufacturing the metal gasket 10.

Figure 5A:
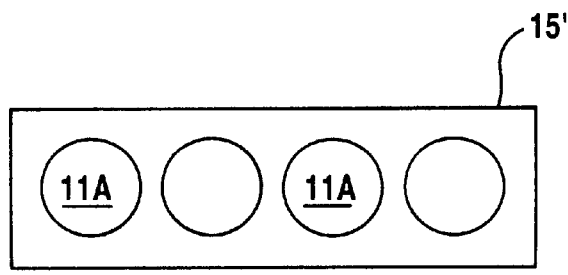
FIGS. 5A to 5E are diagrams explaining a process for manufacturing the metal gasket.

First of all, as shown in FIG. 5A, an elastic metal sheet 15' for the material of the gasket sheet 15 is punched to form openings 11A, the diameters of which are reduced by the diametrical length of the folded portions 20. At this time, although not shown, the water holes and the oil holes 13 may also be formed together with the openings 11A in the elastic metal sheet 15'.

Figure 5B:
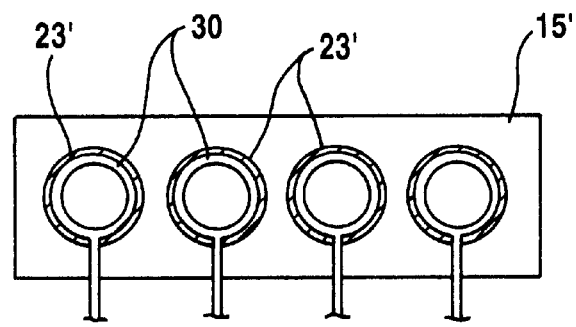

Next, as shown in FIG. 5B, the elastic metal sheet 15' is degreased, and induction coils 30 are inserted into the openings 11A to heat regions 23', as hatched to correspond to the first first hardness lowering regions 23 of the gasket sheet 15, to or near a solution temperature and are then air-cooled or annealed. At this time, in order to prevent the portions, in which the annular beads 16 are to be formed, from being heated, the heating treatment may be performed such that the portions other than the regions 23' are laminated on both their upper and lower faces by masking sheets of an insulating material. Moreover, the heating method may employ laser heating means for a local heating. Here, the diameter of the openings 11A to be formed in the elastic metal sheet 15' may be made slightly smaller than the aforementioned value, and the metal sheet 15' may be punched to the desired size after the regions 23' were annealed. In this modification, the portions, as thermally shrunken by the annealing treatment, can be removed to form the openings 11A of the proper size.

Figure 5C:
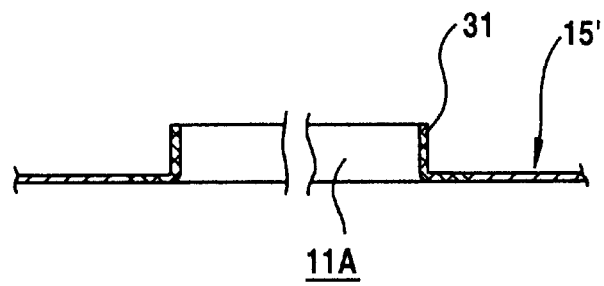
Figure 5D:
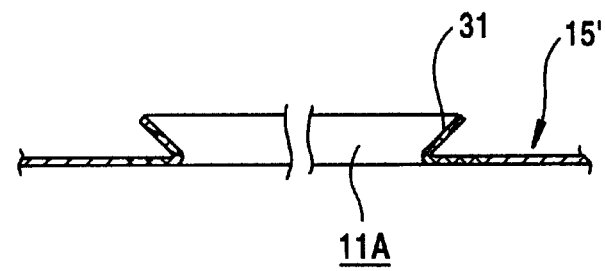
Figure 5E:
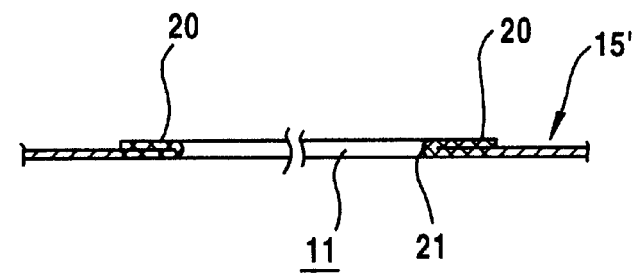

Next, as shown in FIGS. 5C and 5D, the folded portion 20 is formed at the opening edge of the elastic metal sheet 15' by burring, curling and flattening the opening 11A sequentially and by folding back the region 23' at the radially intermediate portion. By omitting the aforementioned annealing treatment, however, the induction coils 30 may be inserted into the opening 11A for the annealing treatment such that the opening 11A is burred or curled. In this modification, as shown in FIGS. 5C and 5D, the induced heat is concentrated at the root of a raised portion 31 which is formed at the opening 11A by the burring or curling treatment, an extremely limited range in the vicinity of the folded edge 21 can be annealed.

Next, the elastic metal sheet 15' is pressed to form the beads 16 to 18 hereby to prepare the gasket sheet 15, and this gasket sheet 15 is coated at its upper and lower faces with the rubber layers to provide the metal gasket 10.

According to this manufacture method, the annealing step has to be added, but the folding treatment is not performed in a hot state so that the metal gasket 10 can be manufactured without any substantial change in the existing manufacture line.

Figure 6A:
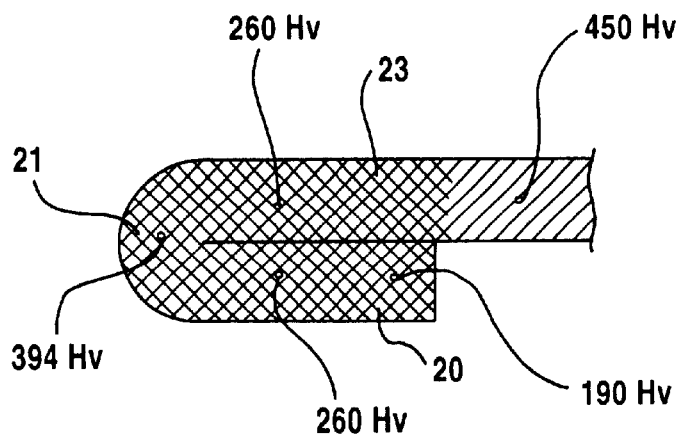
FIGS. 6A to 6C are diagrams explaining a hardness distribution in the vicinity of a folded edge of the metal gasket.
Figure 6B:
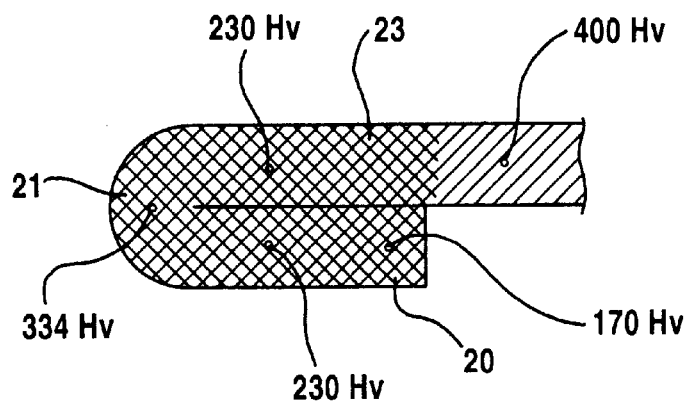
Figure 6C:
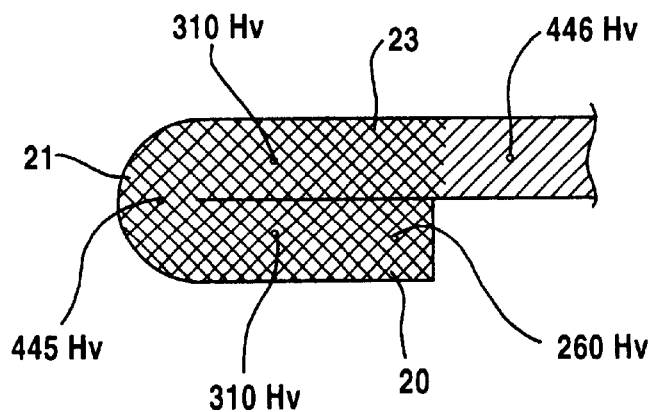

Moreover, the hardness in the vicinity of the folded portions 20 of the gasket sheet 15 thus manufactured takes the distribution of FIG. 6A for the gasket sheet 15 using SUS301-CSP H, the distribution of FIG. 6B for the gasket sheet IS using SUS304-CSP H, and the distribution of FIG. 6C for the gasket sheet 15 using S-4H. In the case of using any of these materials, it is found that the hardness in the folded edges 21 is equal to or lower than that of the portions other than the first hardness lowering regions 23, as cross-hatched, so that the folded edges 21 are prevented from any crack.

Here will be briefly described a metal gasket which has a construction of a plurality of sheets provided with the same folded portion 20 as that of the foregoing embodiment. The detail description of the same members as those of the embodiment will be omitted by designating them by the same reference numerals.

Figure 7:
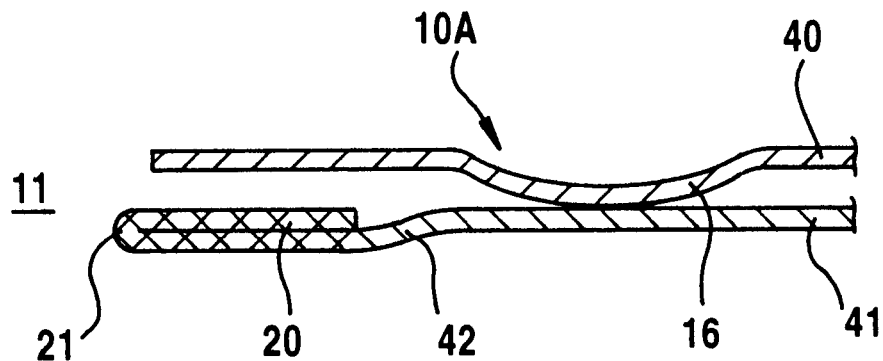
FIG. 7 is a longitudinal section showing the vicinity of an opening of a metal gasket having a construction of a plurality of sheets.

A metal gasket 10A, as shown in FIG. 7, is composed of two gasket sheets: a bead sheet 40 having the annular bead 16 formed at the outer circumference of the opening 11; and a stopper sheet 41 having the folded portion 20 formed at the opening edge such that the bead sheet 40 and the stopper sheet 41 are vertically laminated. This stopper sheet 41 in the metal gasket 10A is made of a material similar to that of the gasket sheet 15 of the foregoing embodiment and is annealed at the cross-hatched portion including the folded edge 21 so that the elongating in the folded edge 21 is sufficiently retained as in the embodiment by the annealing treatment to prevent the cracks. Here, reference numeral 42 designates a stepped portion formed at the outer circumference of the folded portion 20 so as to prevent the stopper sheet 41 from warping.

Figure 8:
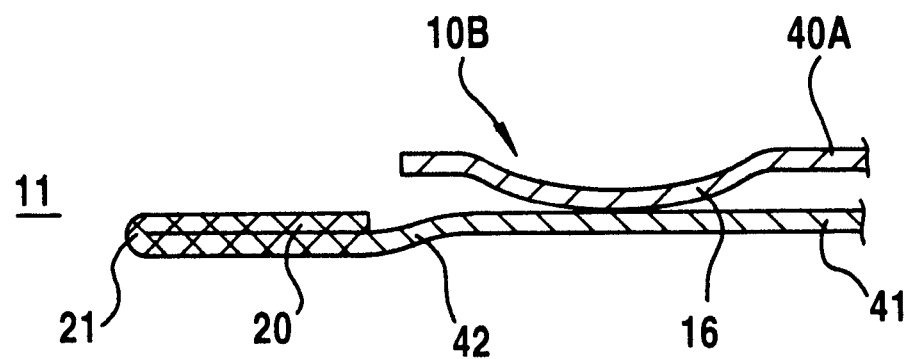
FIG. 8 is a longitudinal section showing the vicinity of an opening of a metal gasket having another construction of a plurality of sheets.

As in a metal gasket 10B shown in FIG. 8, the bead sheet 40 of the metal gasket 10A may be replaced by a bead sheet 40A which is formed outside of the folded portion 20 and given a circumferential edge facing the opening 11, so that no excess compressive force may act upon the folded portion 20.

Figure 9:
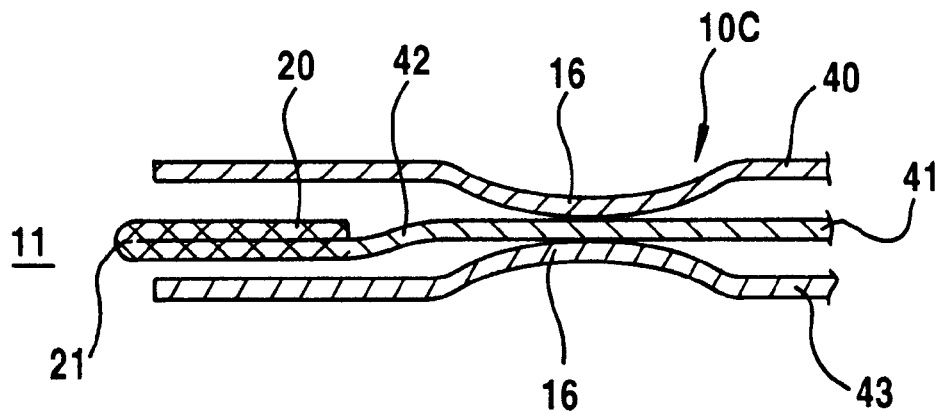
FIG. 9 is a longitudinal section showing the vicinity of an opening of a metal gasket having still another construction of a plurality of sheets.

As in a metal gasket 10C shown in FIG. 9, moreover, it is also possible to manufacture a metal gasket which is composed of three gasket sheets by laminating another bead sheet 43 having the annular bead 16 on the lower side of the stopper sheet 41 of the metal gasket 10A. As in a metal gasket 10D shown in FIG. 10, it is further possible to manufacture a metal gasket which is composed of three gasket sheets by laminating a spacer sheet 44 and the bead sheet 43 on the lower side of the gasket sheet 15. As in a metal gasket 10E shown in FIG. 11, it is further possible to manufacture a metal gasket which is composed of four gasket sheets by laminating the spacer sheet 44 and the stopper sheet 41 between the two bead sheets 40 and 43.

Figure 10:
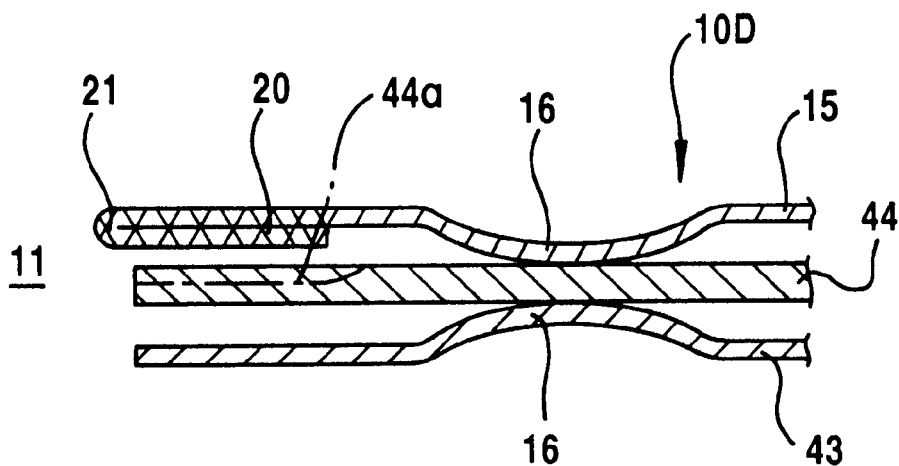
FIG. 10 is a longitudinal section showing the vicinity of an opening of a metal gasket having a further construction of a plurality of sheets.
Figure 11:
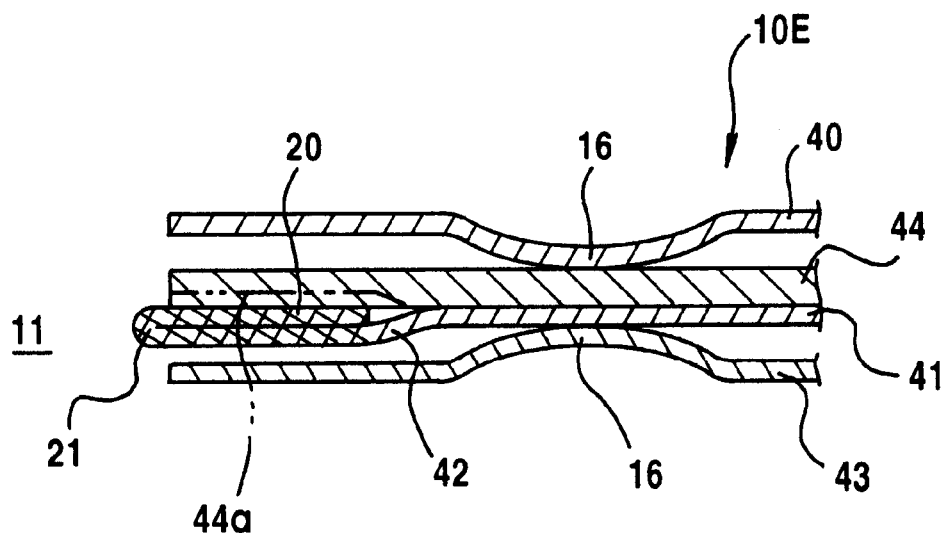
FIG. 11 is a longitudinal section showing the vicinity of an opening of a metal gasket having a further construction of a plurality of sheets.
Figure 12:
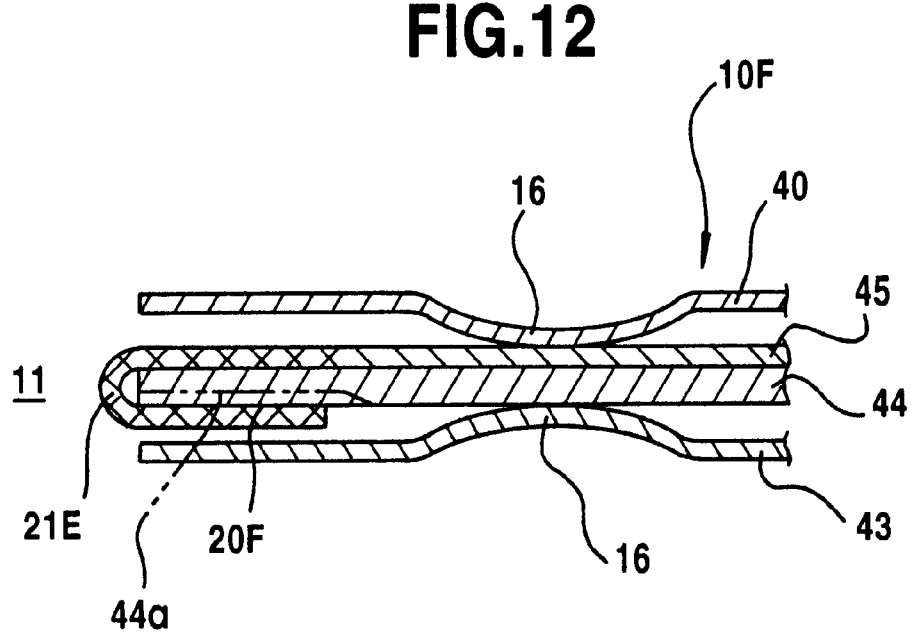
FIG. 12 is a longitudinal section showing the vicinity of an opening of a metal gasket having a further construction of a plurality of sheets.

As shown by phantom lines in FIGS. 10 to 12, moreover, a thinner bearing stress adjusting portion 44a than the remaining portions may be formed at the whole or partial circumference of the portion facing the folded portions 20 and 20F of the spacer sheet 44 so that the bearing stress in the vicinity of the opening 11 may be made even.

A metal gasket 10F, as shown in FIG. 12, is composed of four gasket sheets by arranging a stopper sheet 45 and the spacer sheet 44 vertically between the paired vertical bead sheets 40 and 43 and by forming the folded portion 20F at the opening edge of the stopper sheet 45 in a manner to embrace the opening edge of the spacer sheet 44. In this metal gasket 10F, the elongation of the folded edge 21F is enlarged by annealing the folded edge portion 21F, as cross-hatched, and the folded edge 21E is given a large radius of curvature so that the cracks at the folded edge 21E are more effectively prevented.

Figure 13:
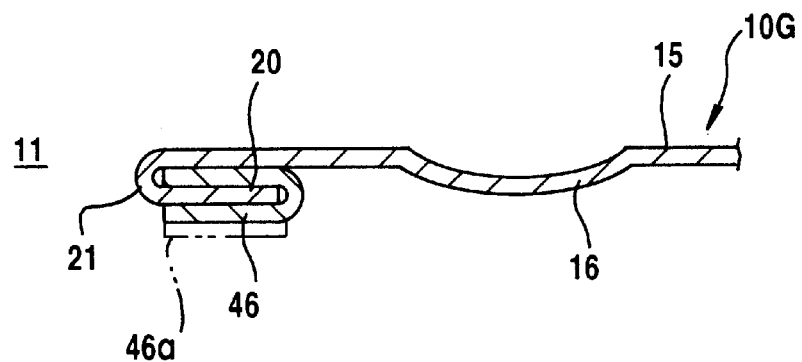
FIG. 13 is a longitudinal section showing the vicinity of an opening of a metal gasket having a sliding sheet.
Figure 14:
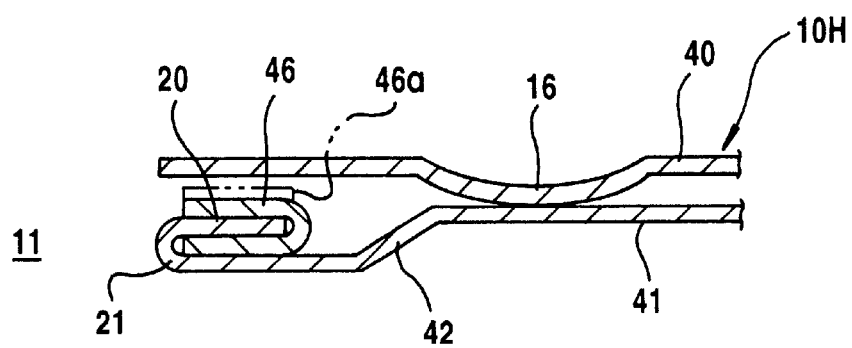
FIG. 14 is a longitudinal section showing the vicinity of an opening of a metal gasket having a sliding sheet.
Figure 15:
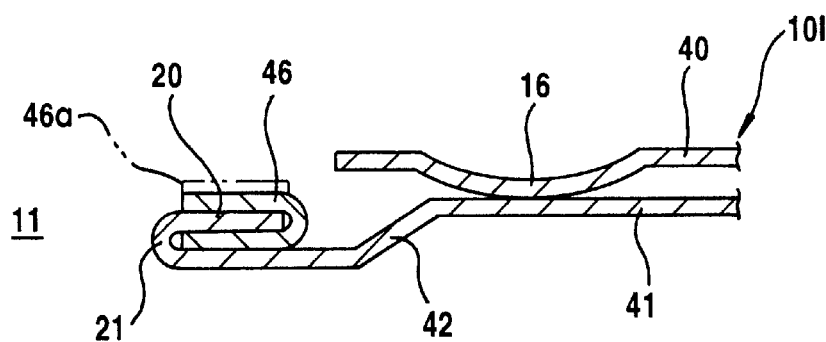
FIG. 15 is a longitudinal section showing the vicinity of an opening of a metal gasket having a sliding sheet.
Figure 16:
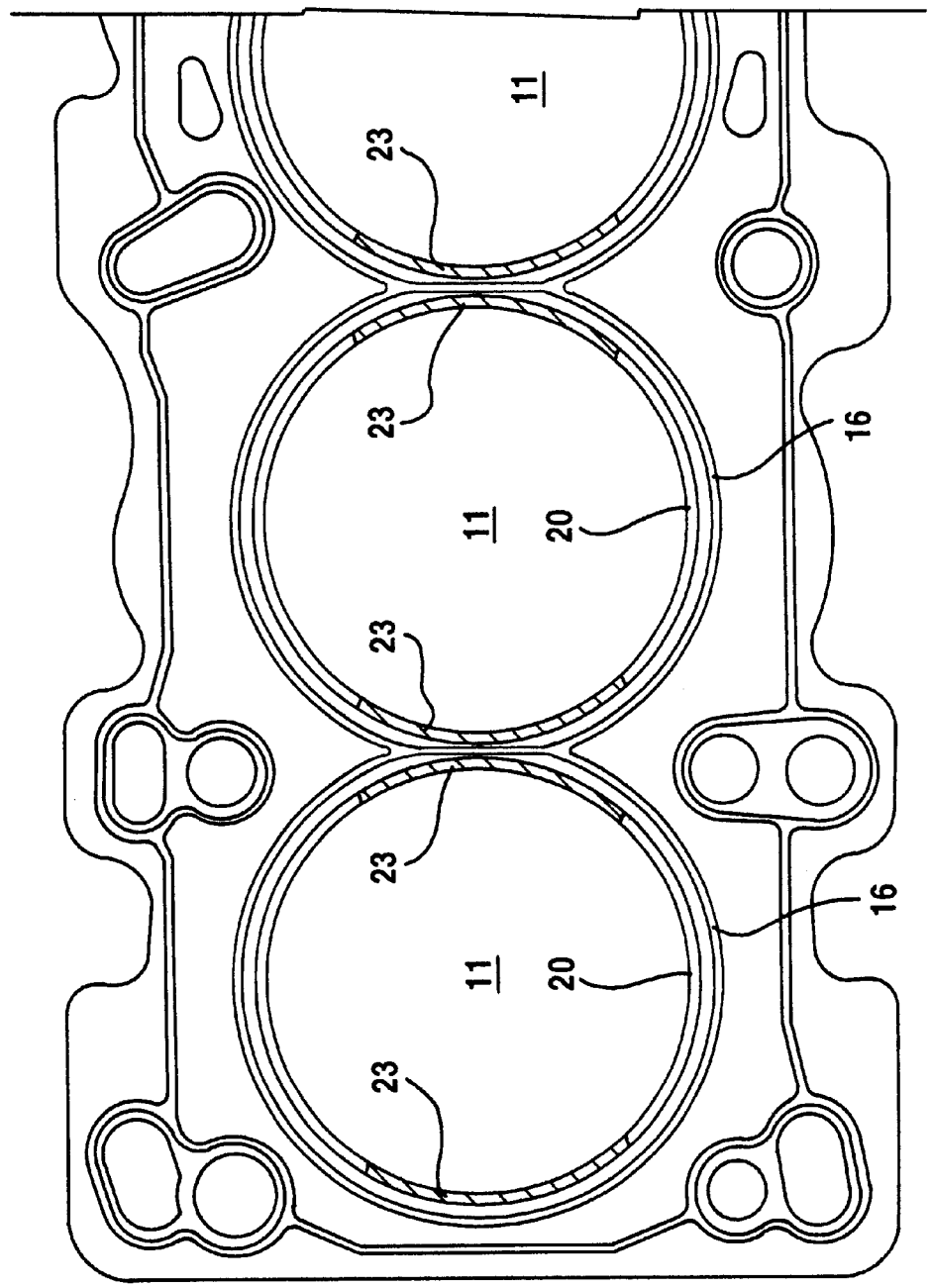
FIG. 16 is a diagram explaining another method of setting a hardness lowering region.

As in a metal gasket 10G shown in FIG. 13, on the other hand, a sliding sheet 46 made of a material having a small friction coefficient may be assembled to embrace the folded portion 20 mutually. With this assembly, the relative movements of the cylinder block 2 and the cylinder head 3 in the transverse direction due to the difference in the coefficient of thermal expansion can be absorbed by the sliding sheet 46, and the radius of curvature of the folded edge 21 is enlarged so that the cracks at the folded edge 21 can be more effectively prevented. Here, this construction can also be easily applied to the foregoing metal gaskets 10A and 10B, as exemplified in metal gasket 10H or 10I shown in FIG. 14 or 15. As indicated by phantom lines in FIGS. 13 to 15, moreover, a sliding member 46a, as made of a material having a small coefficient of friction, such as graphite, PTFE or teflon, may be formed on the outer face of the sliding sheet 46 by the screen printing or spray coating method. Still moreover, the sliding sheet 46 may be omitted, and the sliding member 46a may be formed on the outer faces of the folded portions 20 and 20F.

Here, a plurality of gasket sheets composing those metal gaskets 10A to 10I are bound in the laminated shape either through the not-shown rivets or eyelets, or by the curling, mechanical clinching or welding method. Moreover, a rubber coating layer may be formed on at least one of the opposed faces of the gasket sheets composing the metal gaskets 10A to 10I and on the opposed faces of the cylinder block 2 and the cylinder head 3.

The invention can be likewise applied to a metal gasket having a construction other than those of the shown embodiments, if the metal gasket has the folded portion.

Figure 17A:
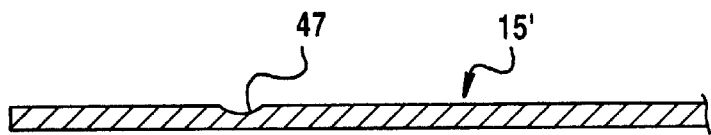
FIGS. 17A and 17B are longitudinal sections showing the vicinity of another construction before and after the folding, respectively.
Figure 17B:
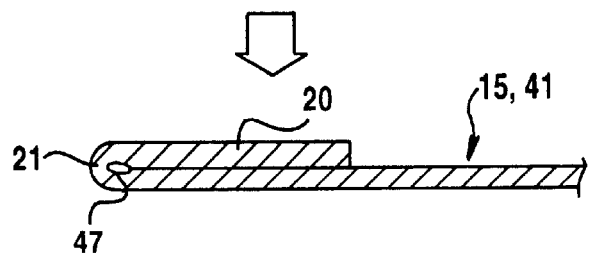

Here will be described other embodiments in which the construction of the folded portion 20 is partially modified. (1) When a rolled sheet is employed as the material for the gasket sheet 15 or the stopper sheet 41 or 45, the first hardness lowering region 23 may be formed in the hatched portion within the range of a predetermined angle around the portion, as extending at a right angle with respect to the rolling direction, of the folded portion 20. With this construction, the cracks at the folded edge 21 can be effectively prevented while minimizing the range for forming the first hardness lowering region 23.
(2) A recess 47 may be formed at the whole or partial circumference of the folded edge 21 in the elastic metal sheet 15' making the gasket sheet 15 or the stopper sheet 41, as shown in FIG. 17A, and the elastic metal sheet 15' may be folded back to form the folded portion 20, as shown in FIG. 17B. In this modification, a clearance is formed inside of the folded edge 21 to enlarge the radius of curvature of the inner face of the folded edge 21 so that the cracks at the folded edge 21 can be more effectively prevented. Moreover, the recess 47 may be formed to correspond to the first hardness lowering region 23.

If the folded edge 21 is thinned, however, the elongation (or worked extent) at the time of shaping the folded portion 20 is reduced so that the elongation of the folded edge 21 is enlarged to prevent the cracks. Therefore, the recess may be formed in the outer face of the folded edge 21.

Figure 18A:
FIGS. 18A and 18B are longitudinal sections showing the vicinity of another construction before and after the folding, respectively.
Figure 18B:
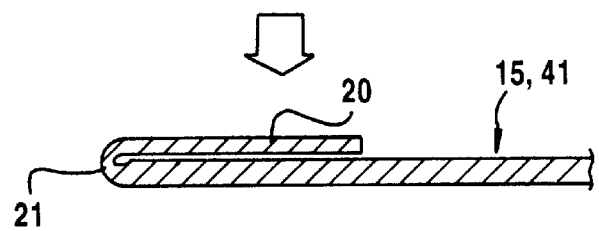
Figure 19A:
FIGS. 19A and 19B are longitudinal sections showing the vicinity of another construction before and after the folding, respectively.
Figure 19B:
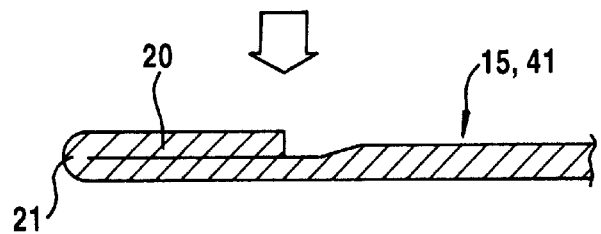

(3) The thickness of the folded portion 20 may be finely adjusted to equalize the bearing stress of the folded portion 20 substantially all over the whole circumference of the opening edge by forming a thinned portion 48 at the whole or partial circumference along the opening edge in the portion, as extending from the position corresponding to the folded edge 21 to the opening edge, of the elastic metal sheet 15' making the gasket sheet 15 or the stopper sheet 41, as shown in FIG. 18A, and by folding back the opening edge around the outer circumference of the thinned portion 48. Alternatively, the folded portion 20 may be formed by forming a thinned portion 49 at the whole or partial circumference of both the folded portion 20 and the portion of the elastic metal sheet 15' corresponding to the portion facing the former, as shown in FIG. 19A, and by folding back the opening edge around the thinned portion 49 at the radially intermediate portion, as shown in FIG. 19B. Here, the thinned portions 48 and 49 may be formed to correspond to the first hardness lowering region 23.

Second Embodiment

In a metal gasket according to this second embodiment, a second hardness lowering region for reducing a spring constant is formed in the bead.

Figure 20:
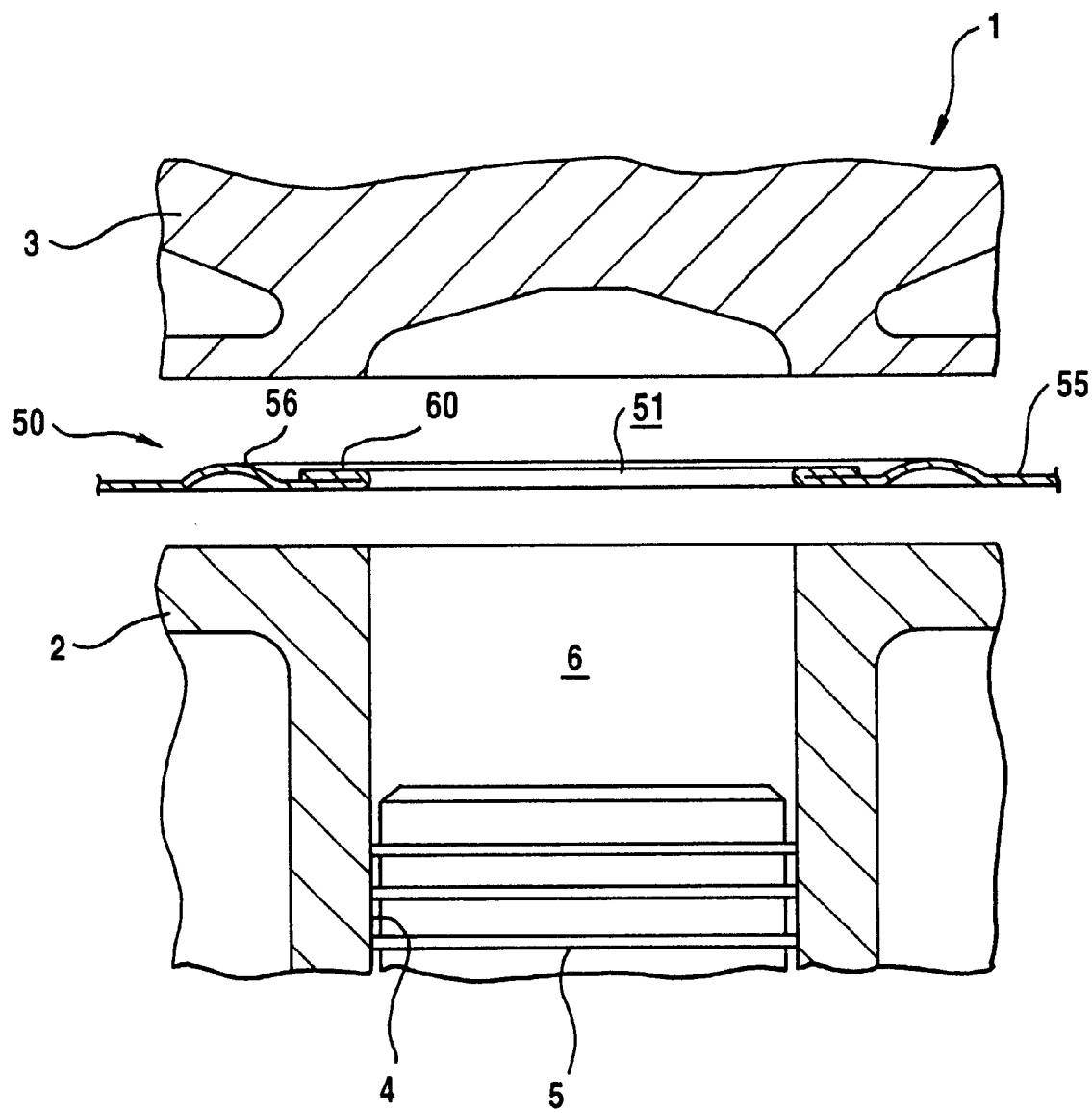
FIG. 20 is a longitudinal section showing an engine which is equipped with a metal gasket of a second embodiment.

As shown in FIG. 20, a metal gasket 50 is assembled between the cylinder block 2 and the cylinder head 3 of an engine 1 having a construction similar to that of the foregoing first embodiment. Here, the construction other than the metal gasket 50 is identical, and the description of the same parts as those of the first embodiment will be omitted by designating them by the same reference numerals.

Figure 21:
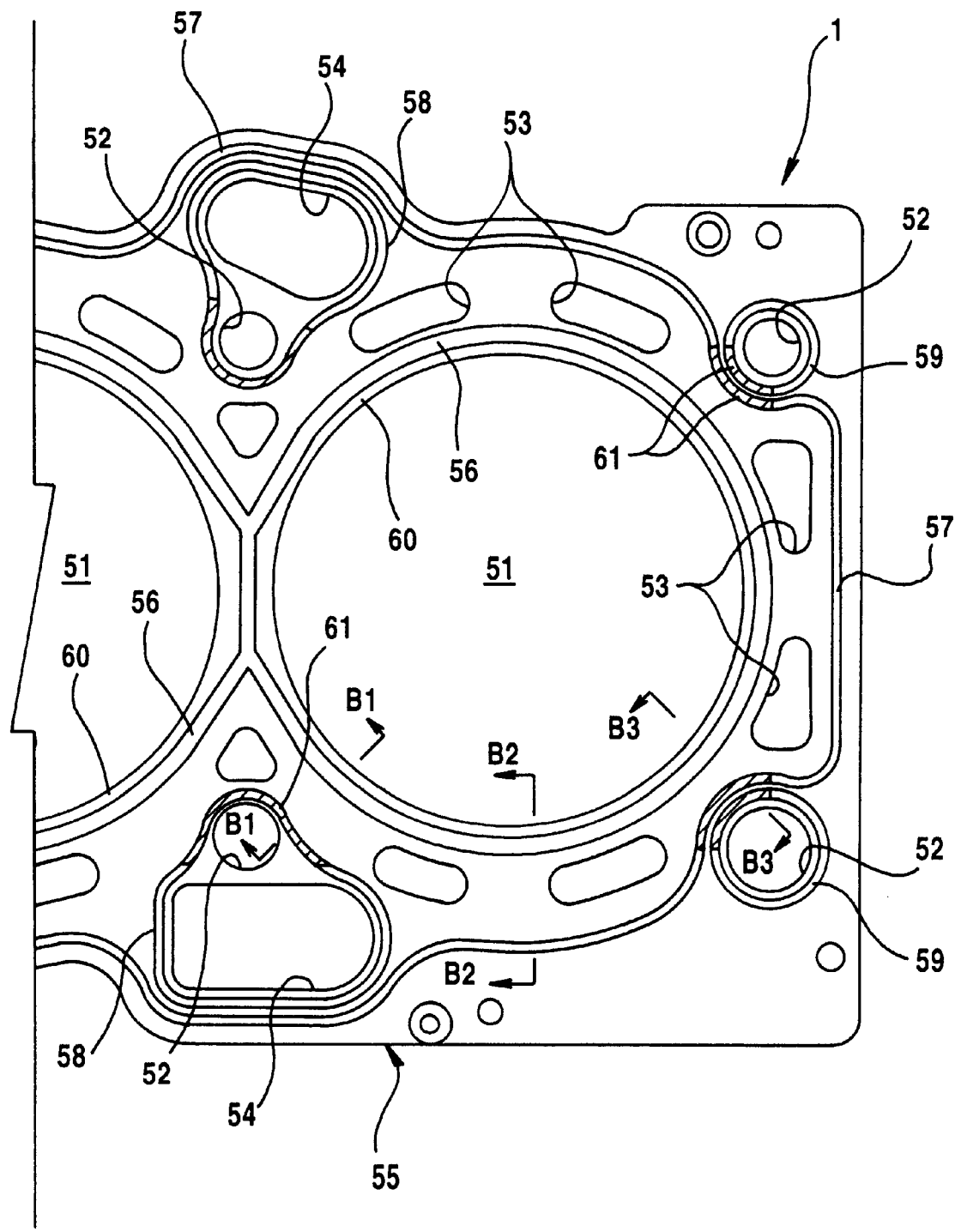
FIG. 21 is a top plan view showing a hardness lowering region of the metal gasket.
Figure 22:
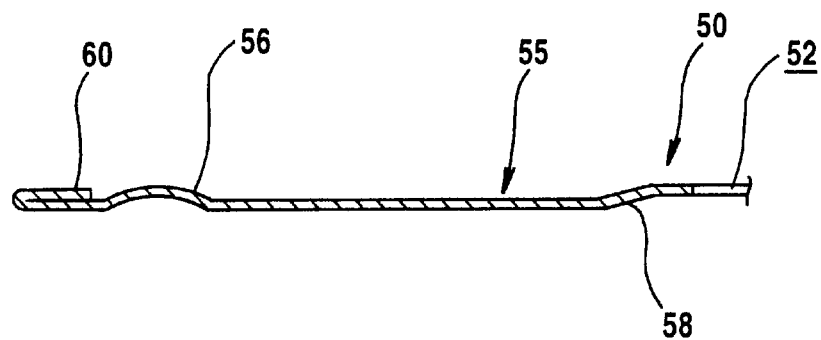
FIG. 22 is a section taken along line B1—B1 of FIG. 21.

In the metal gasket 50, as shown in FIG. 21, there are formed: a plurality of openings 51 which are registered with the cylinder bores 4; a plurality of bolt holes 52 into which the head fixing bolts are inserted; and water holes 53 and oil holes 54 for feeding cooling water and lubricating oil between the cylinder block 2 and the cylinder head 3.

As shown in FIGS. 20 to 24, the metal gasket 50 has a single sheet construction which is made of a gasket sheet 55 of an elastic metal sheet such as a stainless steel sheet or a spring steel sheet, and a (not-shown) rubber coating layer of NBR rubber or fluorine containing rubber formed on both the upper and lower faces of the gasket sheet 55.

This gasket sheet 55 is provided, at the outer circumferential side of the opening 51, with an annular beads 56 of a rounded bead, which are protruded toward the cylinder head 3 and formed to enclose the opening 51 thereby to seal the combustion chamber 6 gas-tight. Moreover, the adjoining annular beads 56 merge into each other in the vicinity of their closest position so that the engine 1 may be small-sized by minimizing the distance between the corresponding cylinder bores 4. However, the annular beads 56 may be independent rounded beads having no merging portion.

In the outer periphery of the gasket sheet 55, on the other hand, there is continuously formed an outer peripheral bead 57 which is stepped up toward the cylinder head 3. Inside of the outer peripheral bead 57 and in the peripheral portions of the bolt holes 52 and the oil holes 5, there are formed hole beads 58 which are stepped up toward the cylinder head 3. Outside of the outer peripheral bead 57 and in the peripheral portions of the bolt holes 52, there are formed hole beads 59 which are stepped down toward the cylinder block 2. However, all the hole beads 58 and 59 may be formed either inside or outside of the outer peripheral bead 57.

Here, since a rounded bead is more reluctant to deform than a stepped bead, the annular beads 56 are made of rounded beads whereas the outer peripheral bead 57 and the hole beads 58 and 59 are made of stepped beads, so that the bearing stress on the annular beads 56 can be set to a higher level than those on the outer peripheral bead 58 and the hole beads 58 and 59 to effectively seal the combustion gas under a high pressure.

At the edge of the opening 51 of the gasket sheet 55, there is formed a portion 60 which is folded back toward the cylinder head 3. A clearance as deep as the thickness of the folded portion 60 is left in the vicinity of the annular bead 56 to prevent the beads 56 to 58 from being abnormally deformed when the head fixing bolts are fastened.

However, the protruding direction, the sectional shape or the layout of the beads 56 to 59 and the folding direction of the folded portions 60 of the metal gasket 50 are properly set according to the construction or the like of the engine 1.

In the vicinity of the bolt holes 52 of the beads 57 to 59, as hatched in FIG. 21, there is formed a second hardness lowering region 61, the hardness of which is lowered from those of the remaining portions. The bearing stresses to act on the beads 57 to 59 are preventing from becoming high in the vicinity of the bolt fastening portions, without widening the beads 57 to 59 in the vicinity of the bolt fastening portions. As a result, it is possible to form such beads without any spatial compulsion that the beads such as the outer peripheral bead 57 and the hole beads 59 have to be arranged close to each other.

In order to lower the hardness by the annealing treatment, moreover, the gasket sheet 55 is made of such a metal material similar to that of the first embodiment as can have excellent spring characteristics and can lower its hardness by the annealing treatment. When the second hardness lowering region 61 is to be formed by the hardening treatment, as will be described hereinafter, it can be made of not only the aforementioned material but also S-4-CSP H (made by Nippon Kinzoku Kogyo Kabushiki Gaisha).

Figure 23:
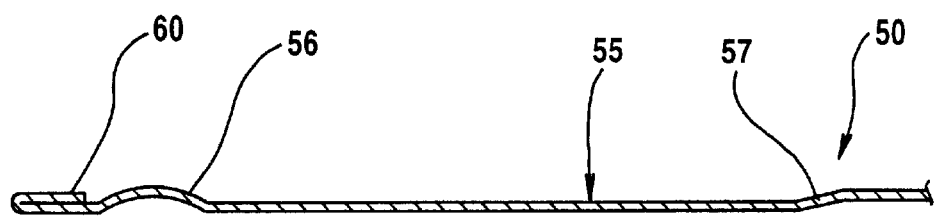
FIG. 23 is a section taken along line B2—B2 of FIG. 21.
Figure 24:
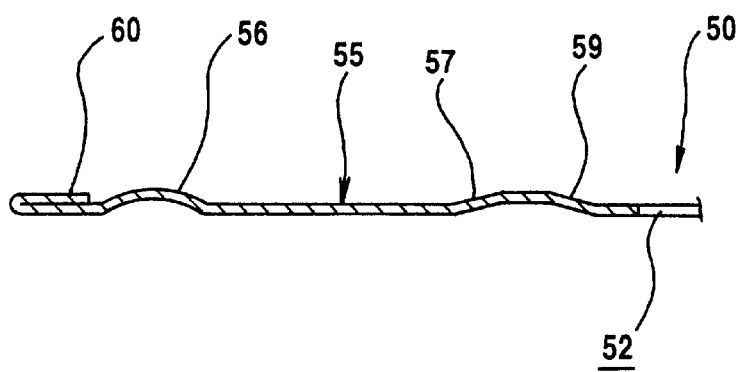
FIG. 24 is a section taken along line B3—B3 of FIG. 21.
Figure 25:
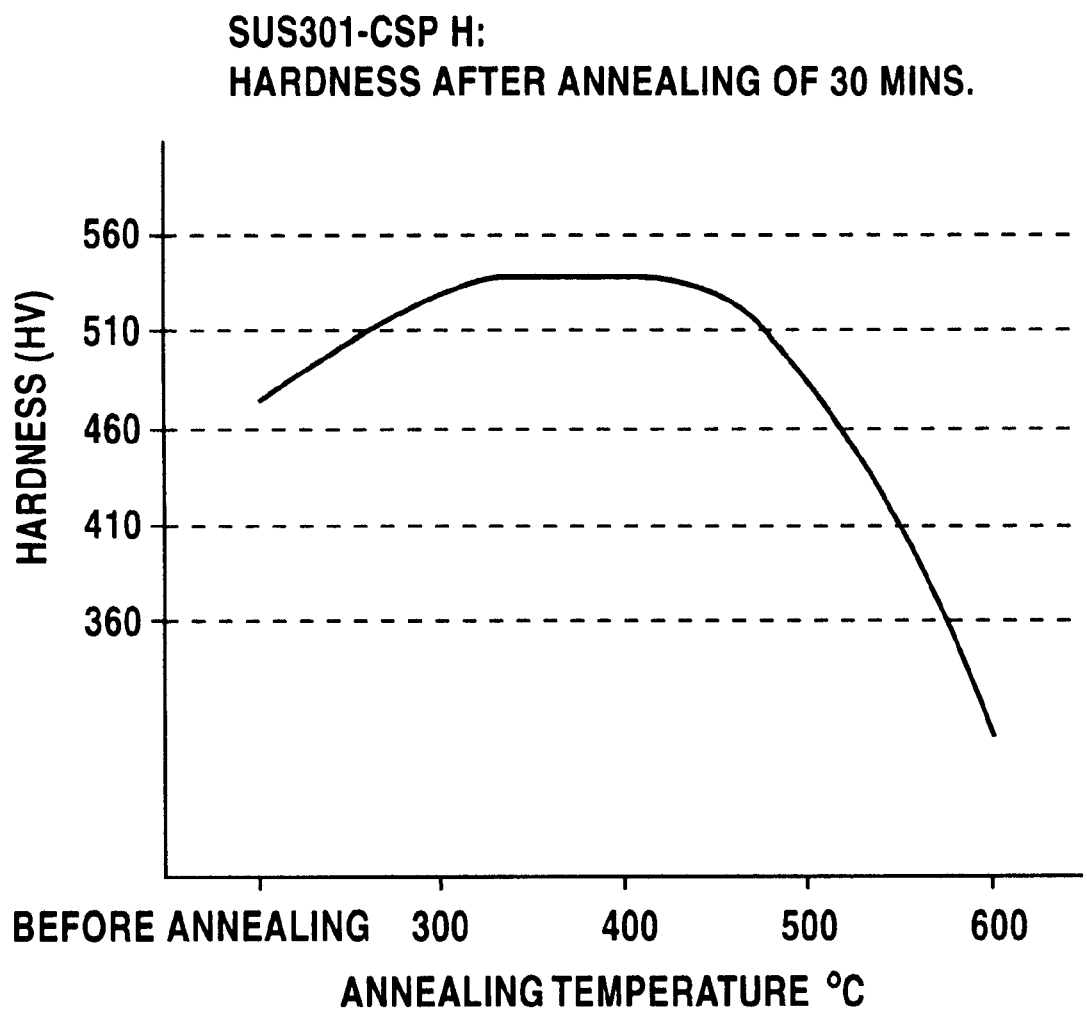
FIG. 25 is a diagram plotting a relation between an annealing temperature and a hardness at an annealing time.

For the SUS301-CSP H stainless steel, for example, by making use of the fact that the hardness is lowered by the annealing treatment, as shown in FIG. 23, the second hardness lowering region 61 is set to a Vickers hardness Hv of 350 to 400, and the remaining portions are set to a Vickers hardness Hv of 500 to 530, so that the bearing stress to act on the beads is lowered in the vicinity of the bolt fastening portions to make even the bearing stresses to act on the individual beads 56 to 59.

Here will be described a process for manufacturing the metal gasket 50.

Figure 26:
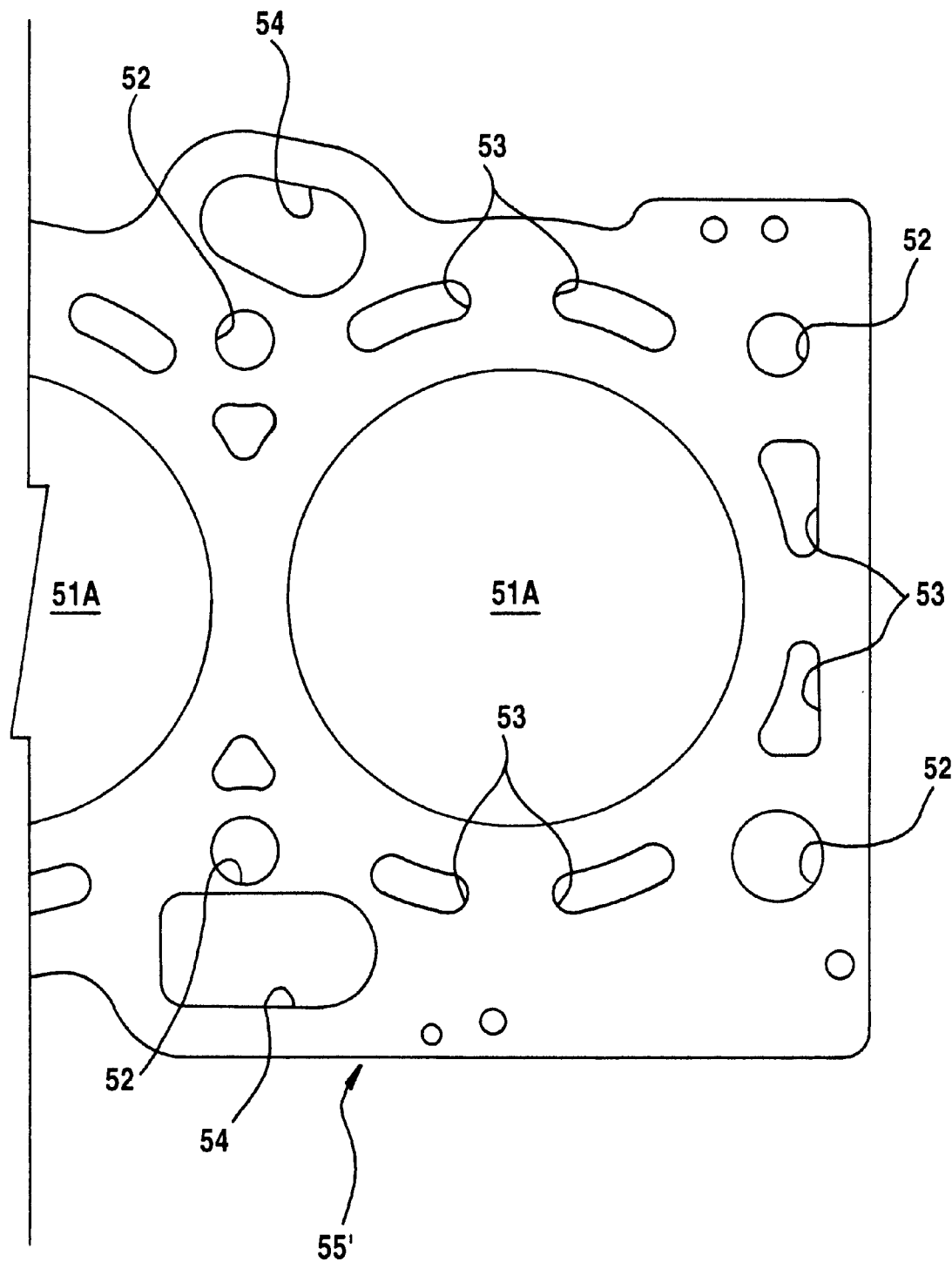
FIG. 26 is a diagram explaining a process for manufacturing the metal gasket.

First of all, at a punching step, as shown in FIG. 26, the elastic metal sheet 55' for the gasket sheet 55 is punched to form the bolt holes 52, the water holes 53 and the oil holes 54 and to form openings 51A which are reduced by the diametrical length of the folded portions 60.

Next, at a bead forming step, the elastic metal sheet 55' is pressed to form the beads 56 to 59 by a pressing apparatus.

Figure 27:
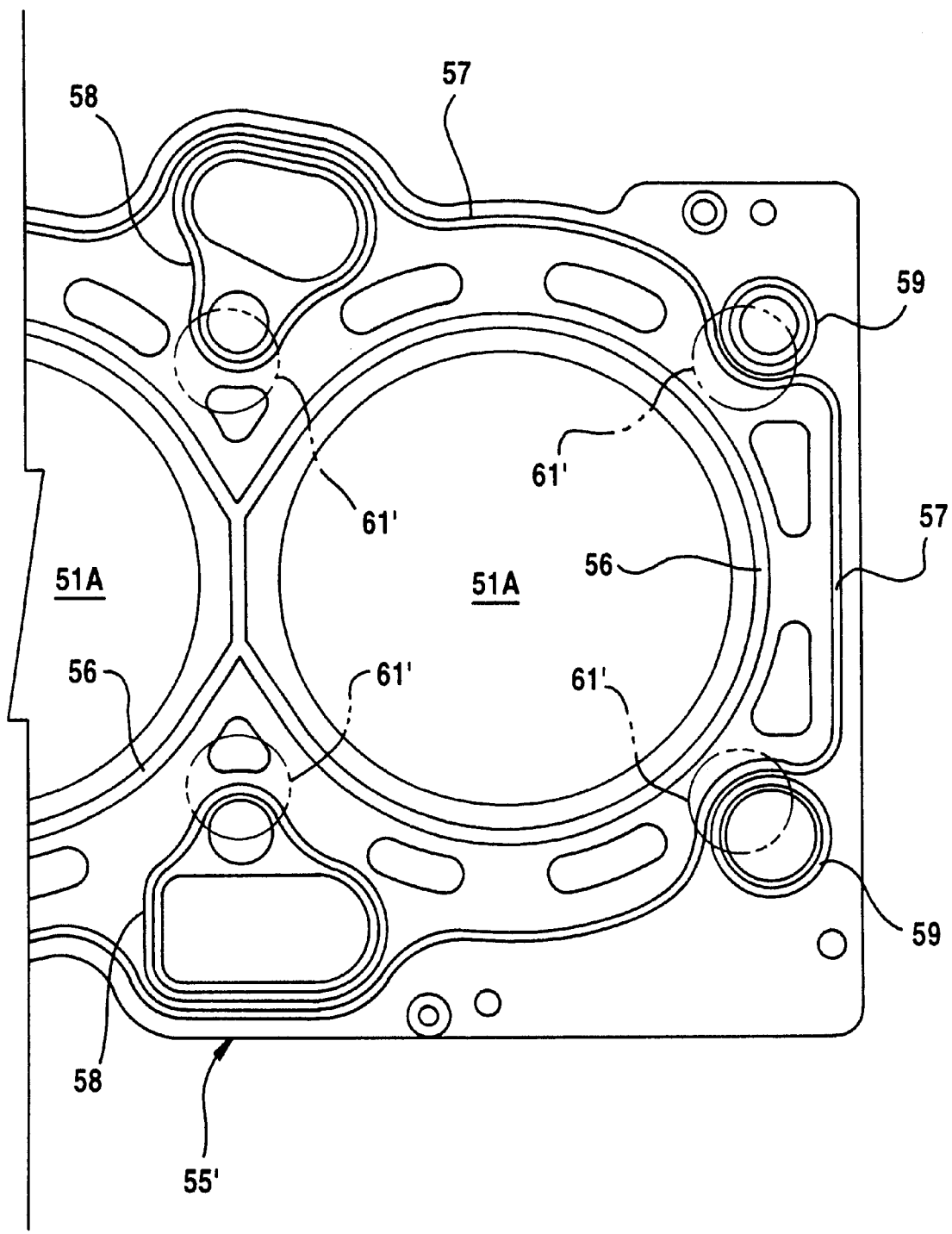
FIG. 27 is a diagram explaining a process for manufacturing the metal gasket.

Next, at an annealing step, the elastic metal sheet 55' is degreased, and the induction coils are bring close to the portion, as corresponding to the second hardness lowering region 61, of the gasket sheet 55 to heat the elastic metal sheet 55' to or near a solution temperature and is then air-cooled or annealed to anneal regions 61', as enclosed by phantom lines in FIG. 27. Here, in order to prevent the portions other than the second hardness lowering region 61 from being heated, the heating treatment may be performed such that the remaining portions other than the second hardness lowering region 61 are laminated on both their upper and lower faces by masking sheets of an insulating material. Moreover, this annealing treatment may be divided into a plurality of times to change the hardness of the second hardness lowering region 61 stepwise.

According to this method, however, the portions as close as to the second hardness lowering region 61 are annealed to lower their hardness. As a matter of fact, the second hardness lowering region 61 and the remaining portions are not clearly defined unlike the second hardness lowering region 61, as hatched in FIG. 21. Even if the hardness of the gasket sheet 55 is more or less lowered in the vicinity of the second hardness lowering region 61 as in the region 61', the sealing performances are not adversely affected. When the second hardness lowering region 61 and the remaining portions are to be clearly defined, it is conceivable to use laser heating means enabled to perform the local heating, as the heating method.

Here, the annealing treatment after the bead formations is preferable for preventing the stress corrosion cracks or the bead cracks. At the bead forming step, more specifically, an internal stress is left in the beads 56 to 59, because these beads 56 to 59 are formed by deforming the elastic metal sheet 55' plastically, but the internal stress is eliminated by annealing the beads 56 to 59 at a next annealing step. This makes it possible to prevent the stress corrosion cracks or the bead cracks, as might otherwise be caused by the residual stress.

Next, at a folding-back step, the folded portion 60 is formed in the opening edges of the elastic metal sheet 55' by folding back the openings 51A. At a next coating step, rubber coating layers are formed on both the upper and lower faces of the gasket sheet 55 to manufacture the metal gasket 50.

According to this manufacture process, the annealing step has to be added, but no folding-back treatment is required in a hot state, so that the metal gasket 50 having the second hardness lowering region 61 can be manufactured. Since the heating temperature becomes the lower for the larger distance from the induction coils, the hardnesses of the second hardness lowering region 61 and the remaining portions can be smoothly changed to prevent the cracks, as might otherwise be caused by an extreme change in the hardnesses, in advance.

Here in the manufacture process, the sequence of the punching step, the bead forming step, the annealing step and the folding-back step can be suitably modified if at least the folding-back step comes after the punching step. For example, the sequence may occur in the order of the punching step, the folding-back step, the annealing step and the bead forming step.

In the present embodiment, moreover, the second hardness lowering region 61 is formed by the annealing treatment, and the hardness of this second hardness lowering region 61 is made lower than those of the remaining portions. However, the hardness of the second hardness lowering region 61 can be made lower by annealing the elastic metal sheet 55' such that the portion, as corresponding to the second hardness lowering region 61, of the elastic metal sheet 55' is masked.

Here will be described other embodiments in which the construction of the metal gasket 50 is partially modified.

Figure 28:
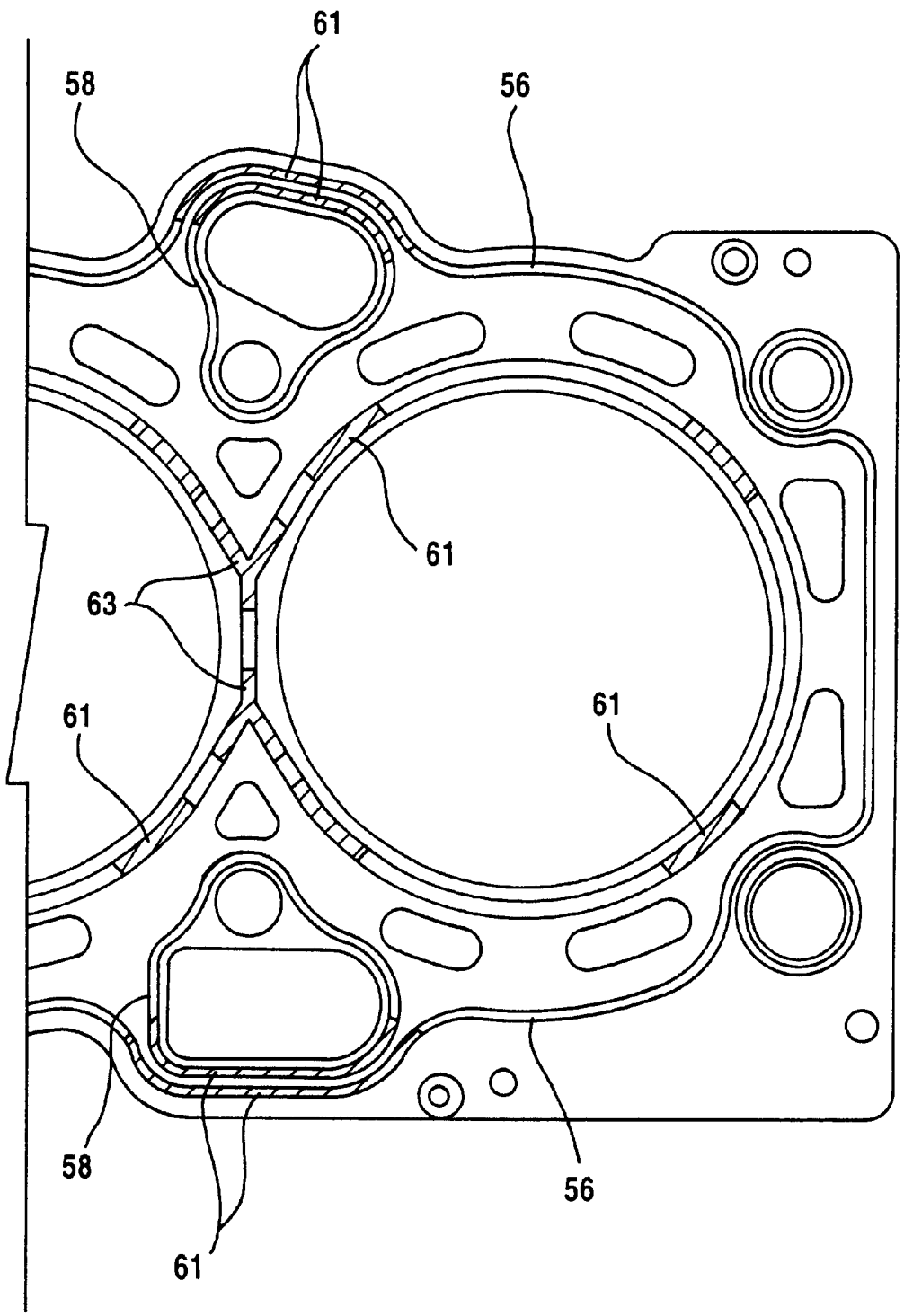
FIG. 28 is a top plan view showing a hardness lowering region of a metal gasket having another construction having a plurality of sheets.

(1) The second hardness lowering regions 61 may be formed, as hatched in FIG. 28, in the portions where the outer peripheral bead 57 and the hole beads 58 adjoin each other, in the merging portions of the annular beads 56, and in the vicinity of the bolt holes in the annular beads 56, to make the bearing stresses even on the beads 56 to 58.

Figure 29:
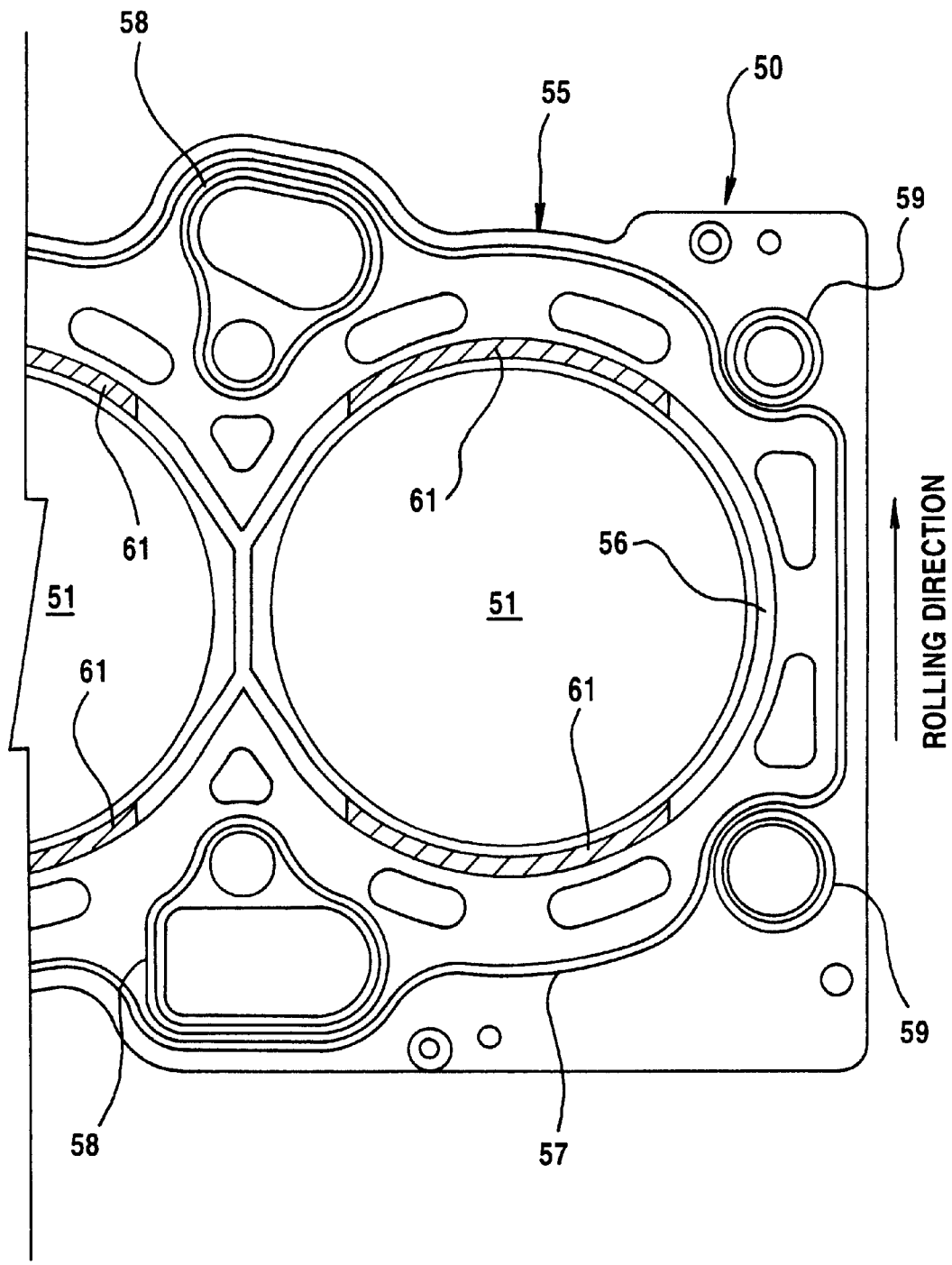
FIG. 29 is a top plan view showing a hardness lowering region of a metal gasket having still another construction having a plurality of sheets.

(2) When a rolled sheet is employed for the gasket sheet 55, the second hardness lowering regions 61 may be formed, as hatched in FIG. 29, in the portions, as extended at a right angle with respect to the rolling direction, of the annular beads 56. In this modification, the fluctuation in the sealing properties of the annular beads 56 in the rolling direction can be prevented to make the bearing stresses even in the annular beads 56.

Figure 30:
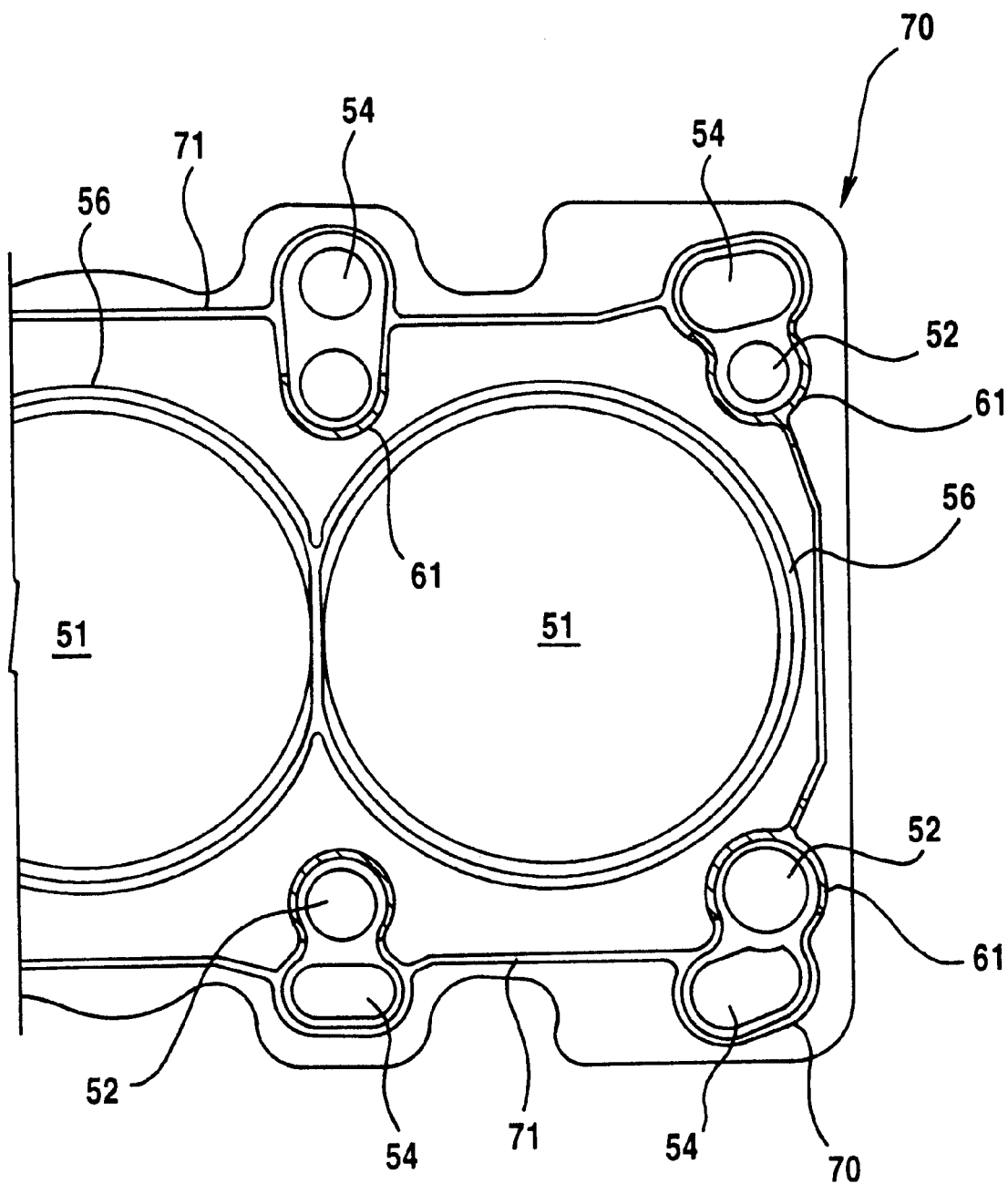
FIG. 30 is a top plan view showing a hardness lowering region of a metal gasket having a further construction having a plurality of sheets.

(3) In a metal gasket 70, as shown in FIG. 30, the outer peripheral bead 57 and the hole beads 58 and 59 may be replaced by an outer peripheral bead 71 of a rounded bead. In this modification, as hatched in FIG. 30, the second hardness lowering regions 61 may be formed in the outer peripheral bead 71 in the vicinity of the bolt holes 52. The second hardness lowering region 61 may also be formed along the whole length of the outer peripheral bead 71 to make the hardness of the outer peripheral bead 71 lower than that of the annular beads 56. As hatched, moreover, the second hardness lowering regions 61 having a locally lowered hardness may be formed in the outer peripheral bead 71 in the vicinity of the bolt holes 52. In this modification, all the beads can be made of rounded beads which are advantageous in space, so that the metal gasket 70 can be made more compact while adjusting the bearing stress.

(4) When the second hardness lowering regions 61 are formed in a plurality of portions, as described above, their hardnesses may be so changed at the portions to be sealed that the optimum sealing performance may be achieved.

Figure 31:
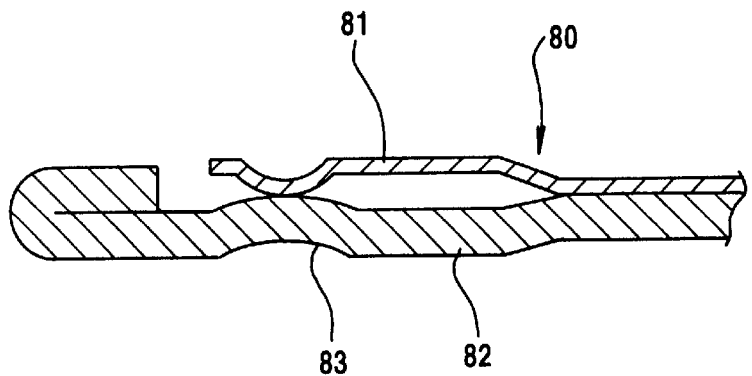
FIG. 31 is a longitudinal section showing the vicinity of a bead of a metal gasket of a further construction having a plurality of sheets.
Figure 32:
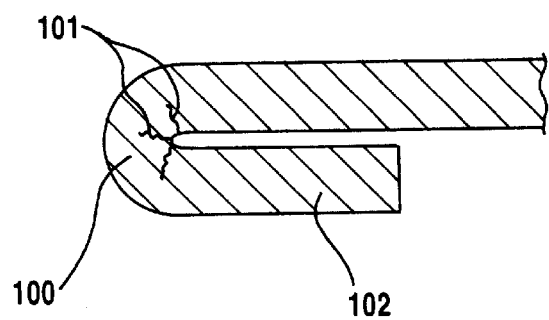
FIG. 32 is a diagram explaining a portion of the folded portion in which cracks are liable to occur.
Figure 33:
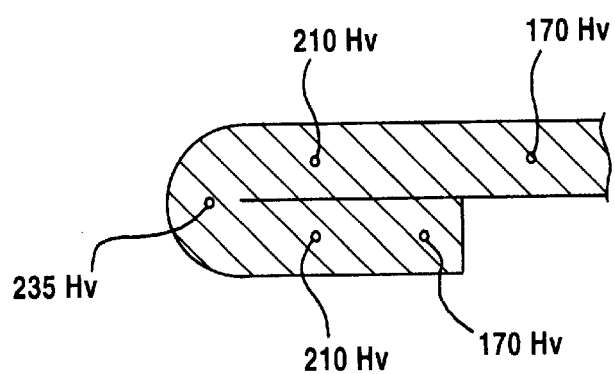
FIG. 33 is a diagram explaining a hardness distribution in the vicinity of the folded edge in a gasket constructing sheet of the prior art.

(5) The invention can be easily applied even to the metal gasket having a construction of a plurality of sheets by making the bead portions, as described above. When the number of gasket sheets to be used is reduced by setting the thickness of one sheet to 0.3 to 0.4 mm so that the metal gasket may be thickened, the hardness adjusting region is preferably formed along the whole length of the beads so that the rigidity of the beads can be lowered to prevent the cracks or the like in the beads. In order that the total thickness of a metal gasket 80, as shown in FIG. 31, may be made as large as about 0.75 mm, the thickness of a gasket sheet 81 is set to 0.2 to 0.3 mm, and the thickness of a gasket sheet 82 is set to 0.3 to 0.4 mm. Then, a bead 83 of the gasket sheet 82 can be freed from the cracks by forming the hardness adjusting region along the whole length of the bead 83.

Moreover, the constructions of the first embodiment and the second embodiment may co-exist to form the second hardness lowering regions individually at the folded portions and the beads.

Here in the present embodiment, the invention is applied to the metal gasket 50 of the multi-cylinder straight engine 1 but can be likewise applied to a metal gasket of a single-cylinder engine or a V-type engine. Moreover, the invention can be likewise applied to a metal gasket of a device other than the engines.

In the metal gasket according to Claim 1, by the simple construction in which the hardness lowering regions are formed in the desired portions of the gasket sheet, the elongations and the spring constants at those portions can be locally adjusted to provide a metal gasket which is excellent in durability and sealing properties.

According to the simple construction of Claim 2, in which the hardness lowering regions having locally lowered hardnesses are formed in the folded edges, the cracks at the folded edges can be reliably prevented by setting a sufficient elongation of the material at the folded edges while exemplifying the material for the metal gasket by a commonly used inexpensive one. Since the spring characteristics at the portions other than the hardness lowering regions are not lowered, moreover, the cracks at the edges of the folded portions can be prevented while retaining sufficient spring characteristics of the beads to enhance the sealing performances, even when the beads and the folded portions are formed in one gasket sheet. As a result, it is possible to provide a metal gasket having an excellent construction of a single sheet or a plurality of sheets.

According to the construction of Claim 3, it is possible to prevent the cracks more effectively at the folded edges.

According to the construction of Claim 4, the first hardness lowering regions can be narrowed to the minimum by setting them in accordance with the rolling direction of the gasket sheet.

According to the construction of Claim 5, it is possible to sufficiently retain the spring characteristics of the annular beads to be arranged in the outer peripheries of the folded portions.

When a ferrite stainless steel sheet, as represented by SUS301-CSP H, SUS304-CSP H or SUS430 conforming to the Japanese Industrial Standards, is used as the material for the gasket sheet, as in Claim 6, the spring characteristics of the gasket sheet at the portions other than the first hardness lowering regions can be sufficiently retained, and the elongations of the first hardness lowering regions in the folded edges can be sufficiently retained to prevent the cracks in the folded edges while improving the sealing performances by the gasket sheet.

By setting the hardness of the first hardness lowering regions to a proper level, as in Claim 7, it is possible to prevent the cracks reliably in the folded edges.

By setting the difference in the hardness between the first hardness lowering regions and the remaining regions to a proper level, as in Claim 8, an abrupt hardness change can be prevented to prevent the cracks, as might otherwise be caused due to the difference in the hardness, in advance.

According to the construction of Claim 9, the radius of curvature of the folded portions can be set to a large value to reduce the elongations of the folded edges at the folding-back time thereby to prevent the cracks more effectively at the folded edges.

According to a metal gasket manufacturing process of Claim 10, the first hardness lowering regions are annealed to prevent the cracks at the folded edges. Although the annealing step has to be added, the folding-back treatment is not performed in the hot state so that the metal gasket of Claims 1 to 9 can be manufactured without any substantial change in the existing manufacture line.

According to a metal gasket manufacturing process of Claim 11, effects similar to those of Claim 10 can be attained, and the sizing accuracy of the openings can be improved to manufacture a gasket sheet having an excellent quality.

According to a metal gasket manufacturing process of Claim 12, effects similar to those of Claim 10 can be attained, and the portions corresponding to the first hardness lowering regions are annealed such that the openings are burled to form the raised portions. As a result, the heat can be concentrated at the roots of the raised portions to effect a spot annealing at the first hardness lowering regions. Even when the beads are arranged close to the outer circumferences of the folded portions, the bead portions can be prevented from being annealed, to retain the spring characteristics of the beads sufficiently.

If the first hardness lowering regions are annealed by the induction heating means or the laser heating means, as in Claim 13, the necessary portions can be heated for a short time period to a desired temperature for the annealing treatment.

According to the metal gasket of Claim 14, all the beads can be set to a proper bearing stress by forming the second hardness lowering regions in the portions where the bearing stress rises, without changing the width and height of the beads. As a result, the sealing performances can be sufficiently retained while reducing the size of the metal gasket by adopting the narrow beads. Moreover, the molding structure for molding the beads can be simplified to lower the cost for manufacturing the mold, and the bearing stress to act on the beads can be adjusted without changing the mold structure, thereby to match the design change easily. If the construction of forming the second hardness lowering regions and the construction of changing the height and width of the beads are combined, the adjusting range of the bearing stress can be set more widely. Moreover, the second hardness lowering regions can be easily formed either by annealing the portions of the elastic metal sheet for the second hardness lowering regions as the gasket sheet or by hardening the portions of the same other than the second hardness lowering regions.

If the hardness of the second hardness lowering regions is adjusted according to the bearing stress demanded for the beads, as in Claim 15, the bearing stress to act on the beads can be adjusted more finely to improve the sealing performances.

If the hardness of the second hardness lowering regions is smoothly changed in the longitudinal direction of the beads, as in Claim 16, it is possible to prevent the cracks, as might otherwise be caused by an abrupt hardness change, in advance.

If there are formed a plurality of beads of different sealing conditions, one of which is formed in its whole length of the second hardness lowering region, as in Claim 17, different sealing performances can be achieved by the beads of a shape to make a mold structure simply for forming the beads. The gasket sheet can be smaller-sized by replacing the stepped beads by the rounded beads made of the second hardness lowering regions in their whole length.

If the second hardness lowering regions re formed to equalize the bearing stresses of a series of beads, as in Claim 18, the sealing performances are less dispersed in the individual portions of the beads so that they can be enhanced as a whole.

If the gasket sheet of a rolling sheet is used to form the second hardness lowering regions in the portions, as extended at a right angle with respect to the rolling direction of the rolling sheet, of the beads, as in Claim 19, the hardness of the beads can be prevented from varying in dependence upon the rolling direction thereby to improve the sealing performances more.

In order to reduce the number of gasket sheets in the thick metal gasket having the plural-sheet construction, on the other hand, the gasket sheets are frequently as thick as 0.3 to 0.4 mm, as in Claim 20. In these thick gasket sheets, the second hardness lowering regions are formed in the bead portions so that the hardness of the gasket sheets can be lowered at the bead portions to prevent the drop in the functions of the beads.

According to the metal gasket manufacturing process of Claim 21, the step of annealing the second hardness lowering regions is added to the existing manufacture process so that the metal gasket having the second hardness lowering regions can be easily manufactured.

If the second hardness lowering regions are annealed by using the induction heating means or the laser heating means, as in Claim 22, the necessary portions can be heated for a short time period to a desired temperature for the annealing treatment.

According to the metal gasket manufacturing process of Claim 23, the step of hardening the portions other than the second hardness lowering regions is added to the existing manufacture process so that the metal gasket having the second hardness lowering regions can be easily manufactured.

What is claimed is:

1. A metal gasket comprising a gasket sheet further comprising:

an opening formed to correspond to a cylinder bore;

a folded portion formed along the whole circumference of the edge of said opening; and wherein a hardness lowering region having a locally lowered hardness is formed in said gasket sheet in at least one of a portion to be set to have a large elongation and a portion to be lowered in a spring constant, and a first hardness lowering region formed as said hardness lowering region in a part of the portion of a folded edge of at least said folded portion for enlarging the elongation;

remaining portions of the gasket sheet are a portion other than said portion to be set to have the large elongation and said portion to be lowered in the spring constant.

2. A metal gasket according to claim 1 wherein the hardness of said first hardness lowering region is made no less than that of the remaining portions.

3. A metal gasket according to claim 1 or 2, wherein said gasket sheet is made of a rolled sheet, and wherein said first hardness lowering region is formed in the portion within a range of a predetermined angle around the portion, as extended at a right angle with respect to the rolled sheet, of said folded edge.

4. A metal gasket according to claim 1 or 2, wherein an annular bead is formed at the outer circumference of said folded portion, and wherein said first hardness lowering region is formed in at least a part of the circumference at the inner circumference of said annular bead.

5. A metal gasket according to any one of claims 1 or 2, wherein the gasket sheet forming said folded portion is made of a ferrite stainless steel sheet.

6. A metal gasket according to claim 1 or 2, wherein the hardness of said first hardness lowering region is set to a Vickers hardness Hv of 170 to 445.

7. A metal gasket according to claim 2 or 3, wherein the difference between the hardnesses of said first hardness lowering region and the remaining portions is set to a Vickers hardness of 0 to 260.

8. A metal gasket according to claim 1 or 2, wherein at least part of the circumference of said folded edge is made thinner than the remaining portions.

9. A metal gasket manufacturing process comprising:

the step of forming an opening of a desired size in registration with a cylinder bore in an elastic metal sheet as a material for making a gasket sheet composing a metal gasket, wherein a hardness lowering region having a locally lowered hardness is formed in said gasket sheet in at least one of a portion to be set to have a large elongation and a portion to be lowered in a spring constant, and wherein said gasket sheet includes, said opening formed to correspond to said cylinder bore, a folded portion formed along the whole circumference of the edge of said opening, and a first hardness lowering region formed as said hardness lowering region in the portion of the folded edge of at least said folded portion for enlarging the elongation;

the step of annealing a portion, as corresponding to the first hardness lowering region in said gasket sheet, of said elastic metal sheet; and the step of forming said folded portion by folding back the edge of said opening.

10. A metal gasket manufacturing process comprising:

the step of forming an opening slightly smaller than a desired size in registration with a cylinder bore in an elastic metal sheet as a material for making a gasket sheet composing a metal gasket, wherein a hardness lowering region having a locally lowered hardness is formed in said gasket sheet in at least one of a portion to be set to have a large elongation and a portion to be lowered in a spring constant, and wherein said gasket sheet includes, said opening formed to correspond to said cylinder bore, a folded portion formed along the whole circumference of the edge of said opening, and a first hardness lowering region formed as said hardness lowering region in the portion of the folded edge of at least said folded portion for enlarging the elongation;

the step of annealing a portion, as corresponding to the first hardness lowering region in said gasket sheet, and the inner circumferential portion of said elastic metal sheet;

the step of punching said opening to a desired size; and the step of forming said folded portion by folding back the edge of said opening of the desired size.

11. A metal gasket manufacturing process comprising:

the step of forming an opening of a desired size in registration with a cylinder bore in an elastic metal sheet as a material for making a gasket sheet composing a metal gasket, wherein a hardness lowering region having a locally lowered hardness is formed in said gasket sheet in at least one of a portion to be set to have a large elongation and a portion to be lowered in a spring constant, and wherein said gasket sheet includes, said opening formed to correspond to said cylinder bore, a folded portion formed along the whole circumference of the edge of said opening, and a first hardness lowering region formed as said hardness lowering region in the portion of the folded edge of at least said folded portion for enlarging the elongation;

the step of forming a raised portion by burling said elastic metal sheet in the vicinity of said opening of the desired size;

the step of annealing a portion, as corresponding to the first hardness lowering region in said gasket sheet, of the root of said raised portion; and the step of forming said folded portion by folding back said raised portion.

12. A metal gasket manufacturing process according to any of claims 9 to 11, wherein the annealing treatment is performed by employing induction heating means or laser heating means.

13. A metal gasket comprising: a gasket sheet further comprising, an opening formed to correspond to a cylinder bore;

a folded portion formed along the whole circumference of the edge of said opening; and wherein a hardness lowering region having a locally lowered hardness is formed in said gasket sheet in at least one of a portion to be set to have a large elongation and a portion to be lowered in a spring constant, and a first hardness lowering region formed as said hardness lowering region in a part of the portion of a folded edge of at least said folded portion for enlarging the elongation, remaining portions of the gasket sheet are a portion other than said portion to be set to have the large elongation and said portion to be lowered in the spring constant, and wherein said first hardness lowering region is formed in a portion within a range of a predetermined angle around the portion, as extended at a right angle with respect to the rolled sheet, of said folded edge.

* * * * *